(12) United States Patent
Walker et al.

(10) Patent No.: US 9,072,005 B2
(45) Date of Patent: Jun. 30, 2015

(54) QUALITY OF SERVICE CONTROL IN A MULTICAST TRANSMISSION

(75) Inventors: Gordon Kent Walker, Poway, CA (US); George Cherian, San Diego, CA (US); Xiaoxia Zhang, San Diego, CA (US); Gang Bao, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 13/451,480

(22) Filed: Apr. 19, 2012

(65) Prior Publication Data

US 2012/0269110 A1 Oct. 25, 2012

Related U.S. Application Data

(60) Provisional application No. 61/477,560, filed on Apr. 20, 2011.

(51) Int. Cl.
*H04W 28/16* (2009.01)
*H04L 12/18* (2006.01)
*H04L 12/801* (2013.01)

(52) U.S. Cl.
CPC .......... *H04W 28/16* (2013.01); *H04L 12/1863* (2013.01); *H04L 47/15* (2013.01)

(58) Field of Classification Search
USPC .............. 370/230–235, 236–236.2, 252, 312, 370/328, 338, 390
See application file for complete search history.

(56) References Cited

U.S. PATENT DOCUMENTS

| 7,664,072 | B1 | 2/2010 | Ho et al. | |
|---|---|---|---|---|
| 2007/0058626 | A1* | 3/2007 | Keller et al. | 370/390 |
| 2008/0198848 | A1* | 8/2008 | Yamagishi | 370/390 |

(Continued)

FOREIGN PATENT DOCUMENTS

| EP | 1610502 A1 | 12/2005 |
|---|---|---|
| EP | 1804421 A2 | 7/2007 |

(Continued)

OTHER PUBLICATIONS

3GPP TS 26.247 version 10.0.0 Release 10, "Universal Mobile Telecommunications System (UMTS);LTE;Transparent end-to-end Packet-switched; Streaming Service (PSS);Progressive Download and Dynamic; Adaptive Streaming over HTTP (3GP-DASH)", year 2011.

(Continued)

*Primary Examiner* — Michael Thier
*Assistant Examiner* — Eric Myers
(74) *Attorney, Agent, or Firm* — Novak Druce Connolly Bove + Quigg LLP

(57) ABSTRACT

A network entity may dynamically control Quality-of-Service (QoS) for a multicast transmission in a wireless communications system, by initiating a multicast transmission having an initial QoS, and later during the multicast transmission, generating an updated QoS for the multicast transmission. The network entity may generate the updated QoS in response to a network load factor for a multicast area aggregated from base stations in the area. The network load factor may indicate a measure of aggregate available bandwidth in the multicast area. The network entity may provide the updated QoS to mobile entities receiving the multicast transmission, which may process a subsequent portion of multicast content according to the updated QoS.

41 Claims, 20 Drawing Sheets

(56) References Cited

U.S. PATENT DOCUMENTS

| | | | |
|---|---|---|---|
| 2008/0212583 A1* | 9/2008 | Rey et al. | 370/390 |
| 2009/0279701 A1 | 11/2009 | Moisand et al. | |
| 2010/0020756 A1 | 1/2010 | Kennedy | |
| 2010/0246429 A1 | 9/2010 | Hwang et al. | |
| 2010/0315985 A1 | 12/2010 | Moon et al. | |
| 2011/0222403 A1 | 9/2011 | Suh et al. | |
| 2012/0155282 A1* | 6/2012 | Dorenbosch | 370/241.1 |

FOREIGN PATENT DOCUMENTS

| | | | |
|---|---|---|---|
| EP | 2152029 A1 | 2/2010 | |
| JP | 2005525065 A | 8/2005 | |
| WO | 2010001928 A1 | 1/2010 | |

OTHER PUBLICATIONS

International Search Report and Written Opinion—PCT/US2012/034484—ISA/EPO—Aug. 21, 2012.

Panasonic, "Requirements for MBMS enhancements in Rel-7," S1-050700, 3GPP TSG-SA WG1, Jul. 2005.

Panasonic, "Support of enhanced MBMS user services providing multiple QoS levels," S2-052759, 3GPP TSG SA WG2, Nov. 2005.

* cited by examiner

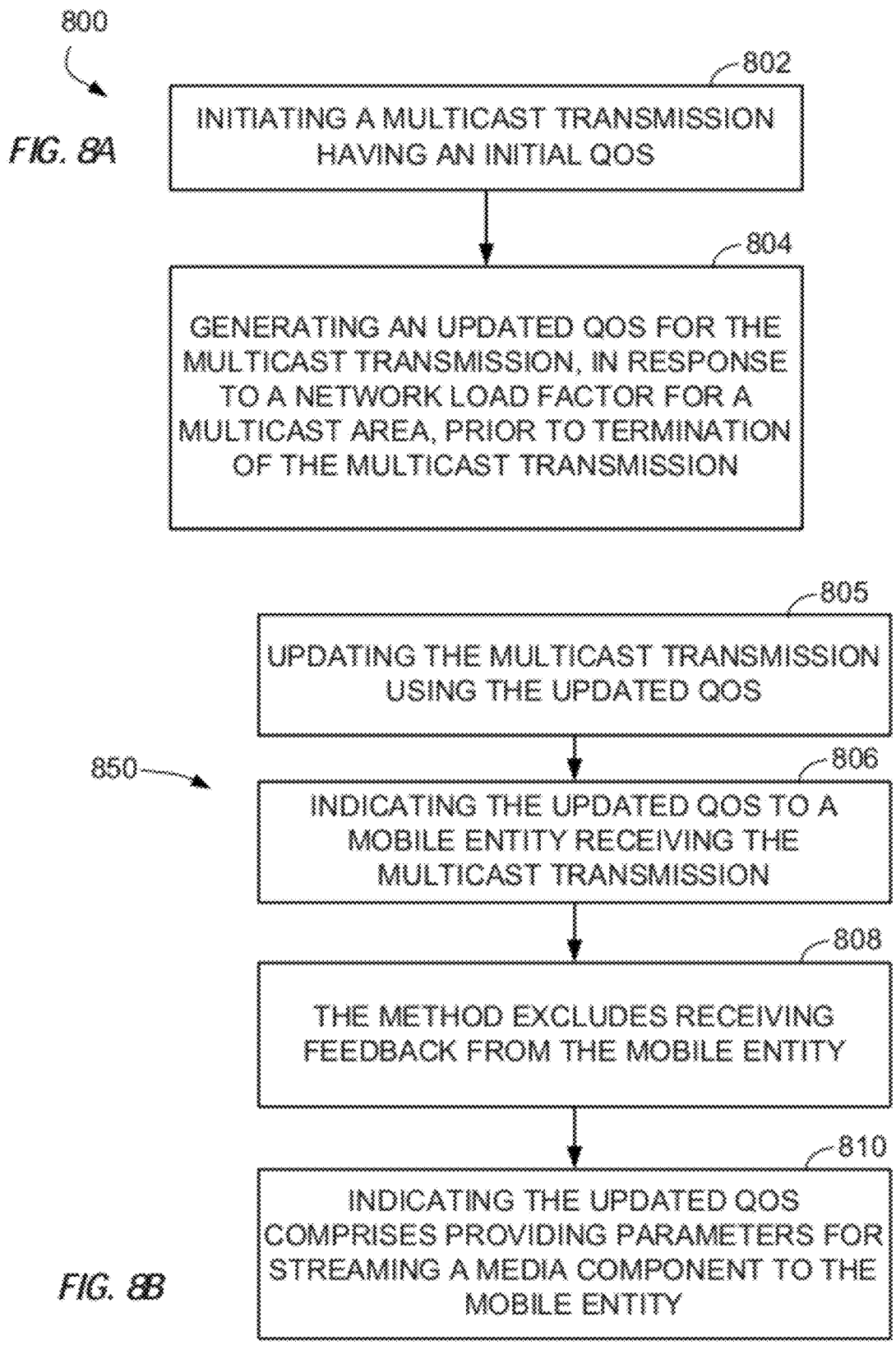

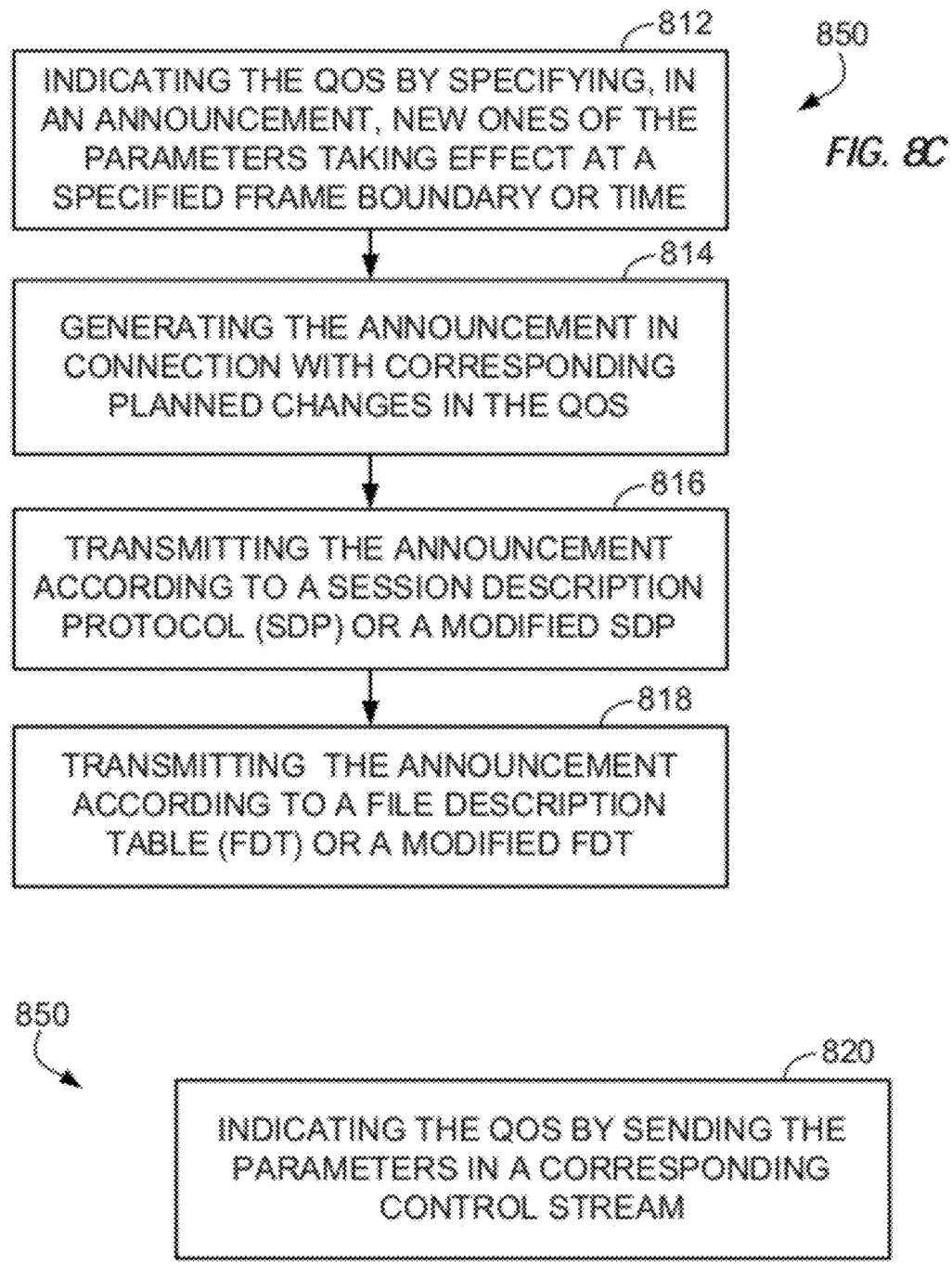

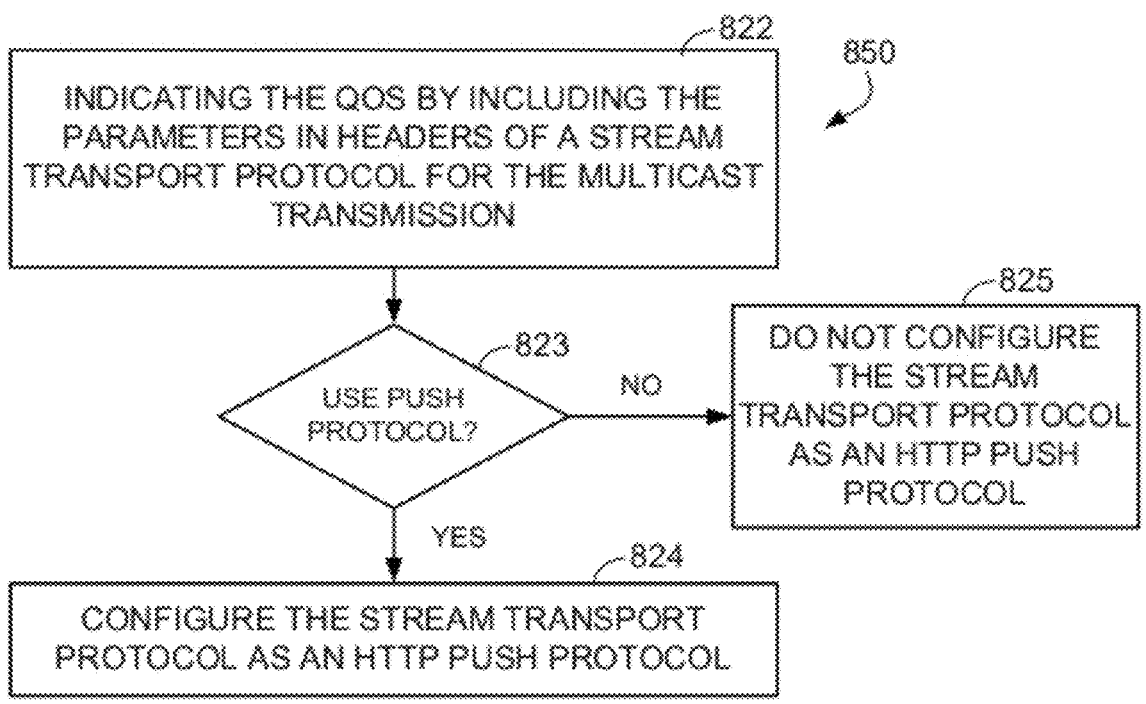

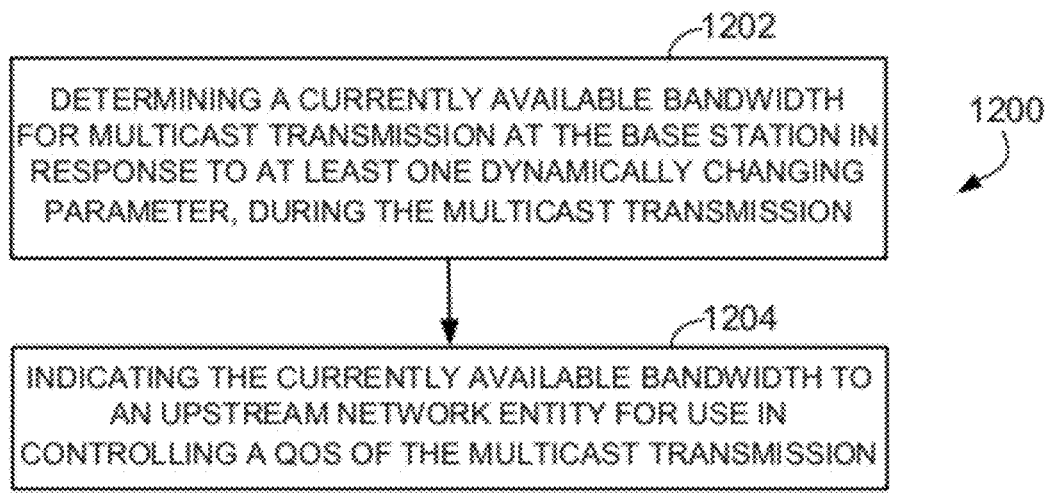
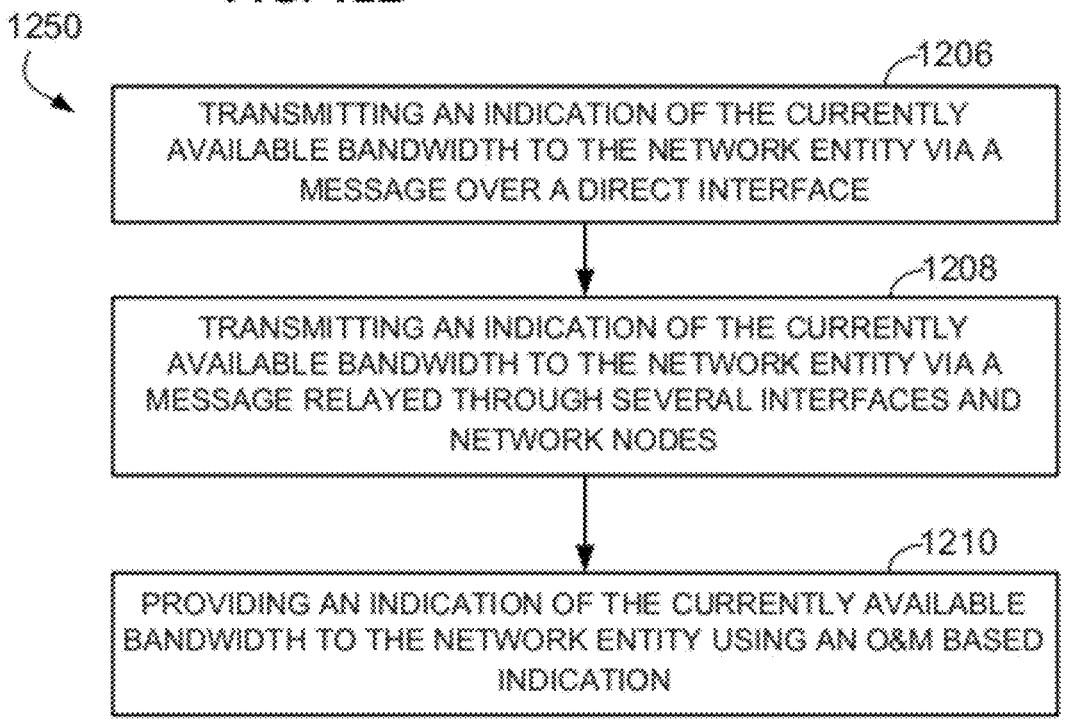

QUALITY OF SERVICE CONTROL IN A MULTICAST TRANSMISSION

CROSS-REFERENCE TO RELATED APPLICATION

This application claims priority pursuant to 35 U.S.C. §119(e) to U.S. provisional application Ser. No. 61/477,560 filed Apr. 20, 2011, which application is hereby incorporated by reference, in its entirety.

FIELD

Aspects of the present disclosure relate generally to wireless communication systems, and more particularly, to controlling Quality of Service (QoS) of Multimedia Broadcast Multicast Service (MBMS) in a wireless communications network or similar multicast broadcast modes in other multicast formats.

BACKGROUND

Wireless communication networks are widely deployed to provide various communication services such as, for example, voice, video, packet data, messaging, or broadcast. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile devices or mobile entities. A UE may communicate with a base station via a downlink and an uplink. The downlink (or forward link) refers to the communication link from the base station to the UE, and the uplink (or reverse link) refers to the communication link from the UE to the base station. As used herein, a "base station" means an eNode B (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile devices, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

In multicast broadcast operation, several eNBs in an area broadcast signals in a synchronized fashion, carrying information that can be received and accessed by any subscriber UE in the broadcast area. The generality of multicast broadcast operation enables greater efficiency in transmitting information of general public interest, for example, event-related multimedia broadcasts. As the demand and system capability for event-related multimedia and other multicast broadcast services has increased, system operators have shown increasing interest in making use of multicast broadcast operation in 3GPP and 3GPP2 networks. In the past, 3GPP LTE technology has been primarily used for unicast service, leaving opportunities for improvements and enhancements related to multicast broadcast signaling. Analogous multicast operations may also be implemented in wireless communications outside of the 3GPP or 3GPP2 context.

SUMMARY

Methods, apparatus and systems for managing QoS of a multicast broadcast in a wireless communication system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for dynamically controlling QoS for a multicast transmission from a network entity of a wireless communications system (WCS) may include initiating a multicast transmission having an initial QoS, and generating an updated QoS for the multicast transmission, in response to a network load factor for a multicast area, prior to termination of the multicast transmission. The method may include updating the multicast transmission using the updated QoS. The updated QoS may replace an initial QoS prior to the termination of the multicast transmission. In an aspect, the network entity may be, or may include, a Broadcast-Multicast Service Center (BM-SC).

In related aspects, the method may include indicating the updated QoS to a mobile entity receiving the multicast transmission. In an aspect, the network entity does not receive feedback from the mobile entity. Indicating the updated QoS may include providing parameters for streaming a media component to the mobile entity, and specifying, in an announcement, new ones of the parameters taking effect at a specified frame boundary or time. In addition, the method may include transmitting the announcement according to at least one of: a Session Description Protocol (SDP), a modified SDP, a File Description Table (FDT), or a modified FDT. In some embodiments, the method may include indicating the updated QoS by at least one of: sending the parameters in a corresponding control stream, or including the parameters in headers of a stream transport protocol for the multicast transmission. The stream transport protocol may be, or may include, an HTTP push protocol.

In other aspects, the method may include communicating with an intermediate node within the WCS to obtain at least one of: feedback indicative of the network load factor, an updated QoS, or one or more additional factors not limited to QOS or network load factors for use in controlling the QoS. The method may further include receiving the network load factor, wherein the network load factor indicates an available bandwidth for the multicast transmission in the multicast area. The method may further include receiving the network load factor from a Multicast Coordinating Entity (MCE) via at least one of a message over a direct interface, a message relayed through several interfaces, or an Operations & Maintenance based indication. In the alternative, or in addition, the method may include receiving the network load factor from an eNode B (eNB) via at least one of a message over a direct interface, a message relayed through several interfaces, or an Operations & Maintenance based indication.

In other aspects for implementation at a mobile entity, a method for using a multicast transmission having a dynamically controlled QoS, using a mobile device, may include receiving a content via a multicast transmission in a wireless communications system, receiving a updated QoS during the multicast transmission, and processing a subsequent portion of the content according to the updated QoS. The method may further include receiving the updated QoS by receiving at least one parameter for processing a media stream of the content. Receiving the parameters may include receiving a corresponding control stream containing the parameters for the media stream. In the alternative, or in addition, receiving the parameters may include receiving announcements each comprising new ones of the parameters for taking effect at one or more specified frame boundaries or times of the media stream. The method may further include receiving ones of the announcements according to at least one of a Session Description Protocol (SDP), or a modified File Description Table (FDT). In another alternative, receiving the parameters may include receiving the parameters in headers of a stream transport protocol for the multicast transmission. The stream transport protocol may be, or may include an HTTP push protocol.

In other aspects for implementations at a network entity, a method for determining dynamic bandwidth availability from a network entity of a WCS for use in controlling QoS of a multicast transmission may include receiving dynamic measures of currently available bandwidth from base stations receiving content for a multicast transmission in a multicast area of the WCS, determining an aggregate available bandwidth for the multicast transmission in the multicast area, during the multicast transmission, and indicating the aggregate available bandwidth for use in controlling a QoS of the multicast transmission. In an aspect of the method, indicating the aggregate available bandwidth may include at least one of: transmitting an indication of the aggregate available bandwidth to an upstream network entity, or providing an indication of the currently available bandwidth to the upstream network entity using an Operations & Maintenance based indication. The method may further include at least one of: transmitting the indication via a message over a direct interface to the upstream network entity, or transmitting the indication via a message relayed through several interfaces to the upstream network entity. In an aspect, the network entity determining the aggregate available bandwidth may be, or may include, a Multicast Coordinating Entity (MCE).

In related aspects, a wireless communications apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as mobile entities or base stations of various types used for wireless communications. Similarly, an article of manufacture may be provided, including a computer-readable storage medium holding encoded instructions, which when executed by a processor, cause a wireless communications apparatus to perform the methods and aspects of the methods as summarized above.

BRIEF DESCRIPTION OF THE DRAWINGS

FIGS. 8A-F illustrate embodiments of a methodology for QoS control in a multicast transmission by a network entity providing multicast broadcast services.

FIGS. 12A-C illustrate embodiments of a methodology for providing network load factors used for dynamic QoS control at a base station.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as, for example, Universal Terrestrial Radio Access (UTRA), or CDMA2000. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
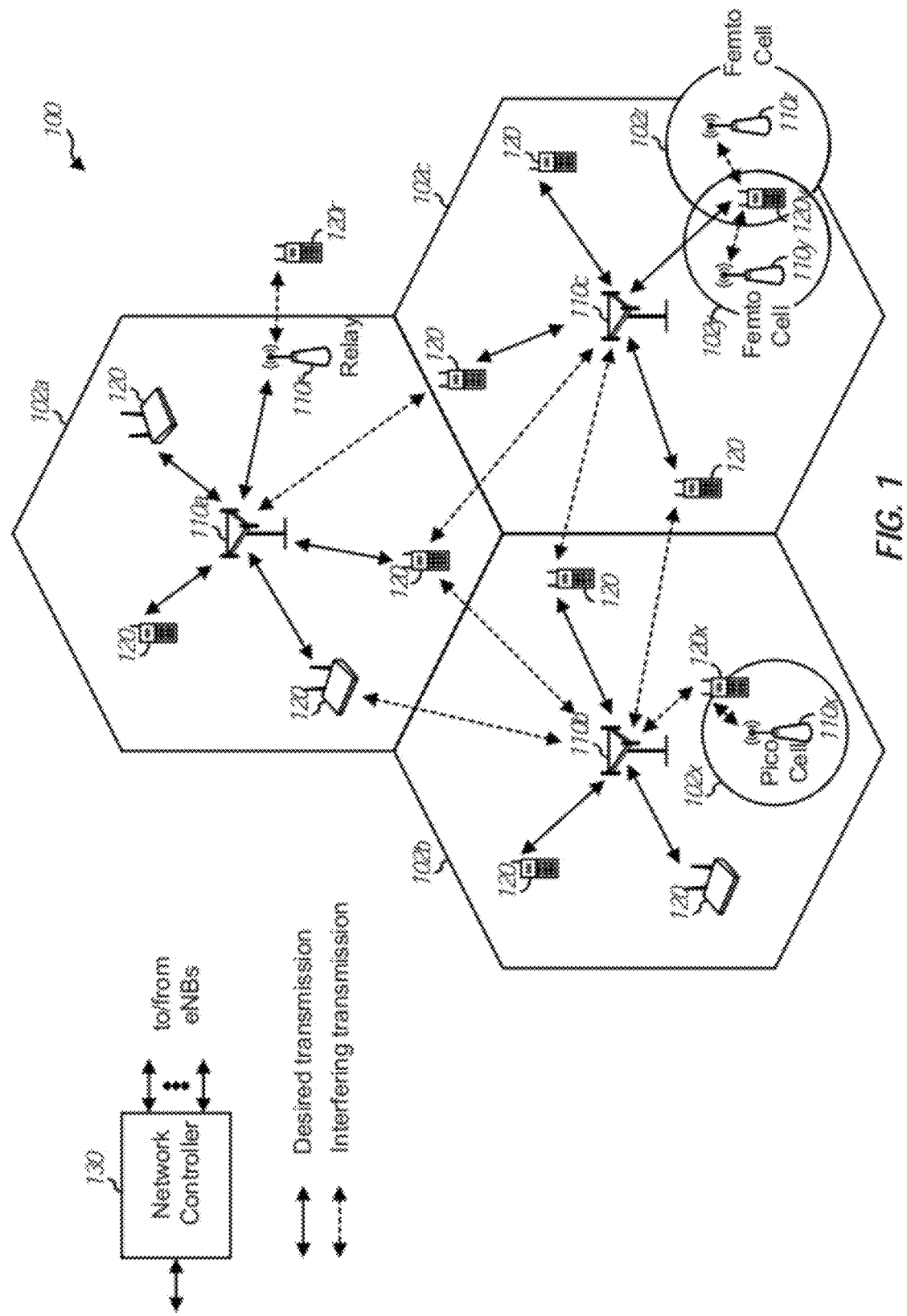
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), or UEs for users in the home). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB or a relay.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. Multicast broadcast operations may require synchronization of base stations within a defined area, but the present technology is not limited thereby. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a mobile entity, a subscriber unit, a station, or other name. A UE may be a cellular phone, a personal digital assistant (PDA), a wireless modem, a wireless communication device, a handheld device, a laptop computer, a cordless phone, a wireless local loop (WLL) station, or other mobile devices. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones or bins. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
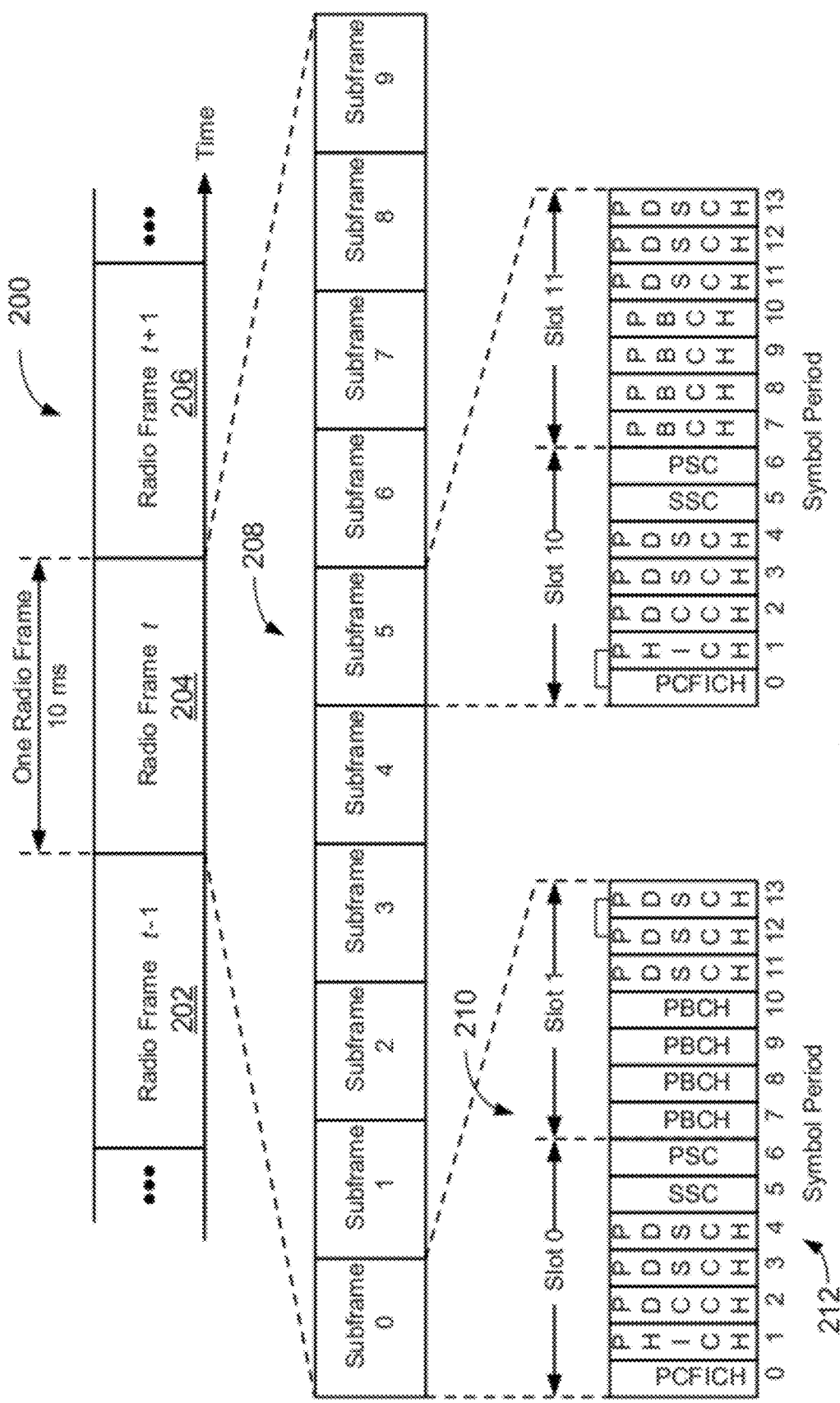
FIG. 2 is a block diagram conceptually illustrating an example of a down link frame structure in a telecommunications system.

FIG. 2 shows a down link frame structure 200 used in LTE. The transmission timeline for the downlink may be partitioned into units of radio frames 202, 204, 206. Each radio frame may have a predetermined duration (e.g., 10 milliseconds (ms)) and may be partitioned into ten subframes 208 with indices of 0 through 9. Each subframe may include two slots, e.g., slots 210. Each radio frame may thus include twenty slots with indices of 0 through 19. Each slot may include L symbol periods, e.g., seven symbol periods 212 for a normal cyclic prefix (CP), as shown in FIG. 2, or six symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. The number of symbol periods M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as, for example, received power, path loss, signal-to-noise ratio (SNR.

Figure 3:
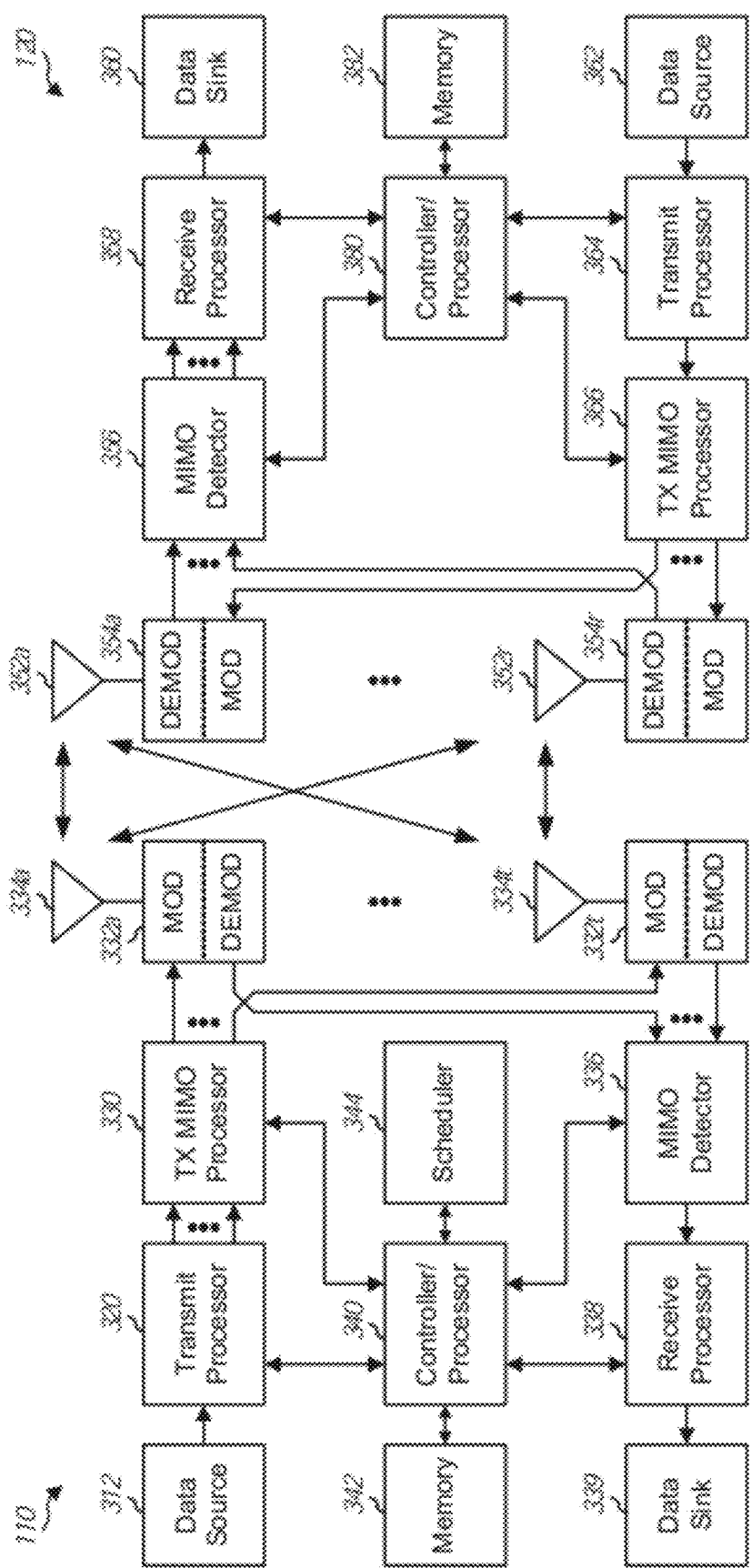
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, or other control channel. The data may be for the PDSCH or other data channel. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380. The processor 380 may also perform or direct the execution of the functional blocks illustrated in FIGS. 10A-B, and/or other processes for performance by a UE according to the techniques described herein.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 12A-C, and/or other processes for the techniques described herein. The memories 342 and 382 may store data and program codes for the base station 110 and the UE 120, respectively. A scheduler 344 may schedule UEs for data transmission on the downlink and/or uplink. Other aspects of the techniques described herein may be performed by other network entities of a wireless communications systems as described elsewhere herein.

eMBMS and Unicast Signaling in Single Frequency Networks

One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, meaning that wireless signals from multiple eNBs reinforce one another rather than interfere with each other at the receiving station. In the context of eMBMS, the shared content is transmitted from multiple eNB's of a LTE network to multiple UEs. Therefore, within a given eMBMS area, a UE may receive eMBMS signals from any eNB (or eNBs) within radio range that belong to the same MBSFN service area. However, to decode the eMBMS signal each UE receives Multicast Control Channel (MCCH) information from a serving eNB over a non-eMBMS channel. MCCH information changes from time to time and notification of changes is provided through another non-eMBMS channel, the PDCCH. Therefore, to decode eMBMS signals within a particular eMBMS area, each UE is served MCCH and PDCCH signals by one of the eNBs in the area.

In accordance with aspects of the subject of this disclosure, there is provided a wireless network (e.g., a 3GPP network) having features relating to single carrier optimization for eMBMS. An efficient way to transmit shared content from an LTE network to multiple mobile devices, such as, for example, UEs, may be provided by eMBMS.

For a physical layer (PHY) of eMBMS for LTE Frequency Division Duplex (FDD), the channel structure may comprise time division multiplexing (TDM) resource partitioning between an eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design allows at most six out of ten subframes for eMBMS.

Figure 4:
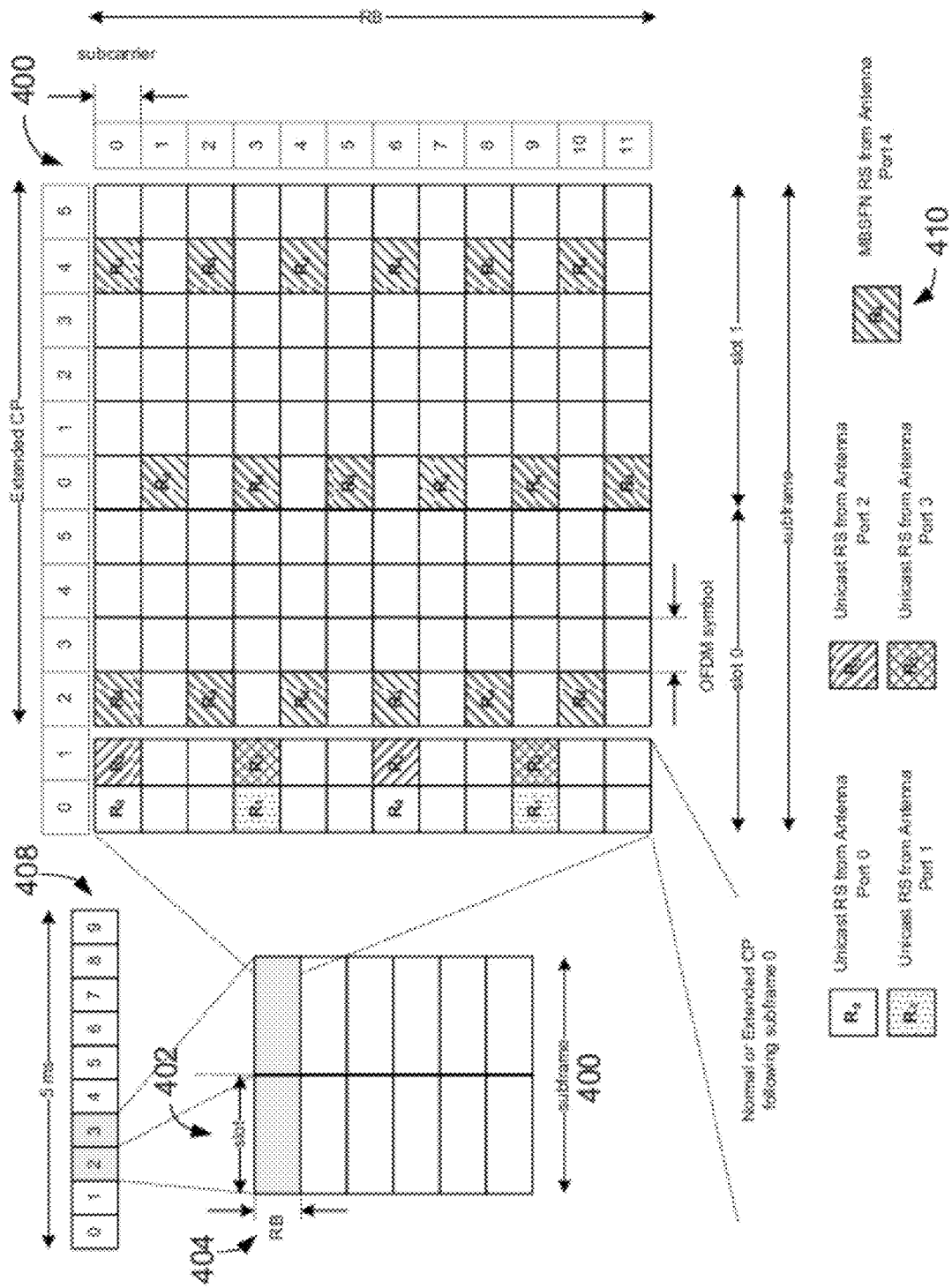
FIG. 4 is a diagram of a signaling frame illustrating an example of symbol allocation for unicast and multicast signals.

An example of subframe allocation for eMBMS is shown in FIG. 4, which shows an existing allocation of MBSFN reference signals on MBSFN subframes 400, for a single-carrier case. Components depicted in FIG. 4 correspond to those shown in FIG. 2, with FIG. 4 showing the individual subcarriers within each slot 402 and resource block (RB) 404. In 3GPP LTE, a RB 404 spans 12 subcarriers over a slot duration of 0.5 ms, with each subcarrier having a bandwidth of 15 kHz. Therefore, the 12 subcarriers together spann 180 kHz per RB. Subframes may be allocated for unicast or eMBMS; for example in a sequence of ten subframes 408 numbered to zero (0) to nine (9), subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

With continued reference to FIG. 4, within each eMBMS subframe 400, the first 1 or 2 symbols may be used for unicast reference symbols (RSs) and control signaling. A CP length of the first 1 or 2 symbols may follow that of subframe 0. A transmission gap may occur between the first 1 or 2 symbols and the eMBMS symbols if the CP lengths are different in adjacent subframes. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes (as shown in FIG. 4), and separately allocating unicast RSs on non-MBSFN subframes. More specifically, as FIG. 4 shows, the extended CP of the MBSFN subframe 400 includes MBSFN RSs 410 but not unicast RSs. The present technology is not limited to the particular frame allocation scheme illustrated by FIGS. 2 and 4, which are presented by way of example, and not by way of limitation. A multicast session, which may also be referred to as a multicast broadcast, may use any suitable frame allocation scheme.

eMBMS Service Areas

Figure 5:
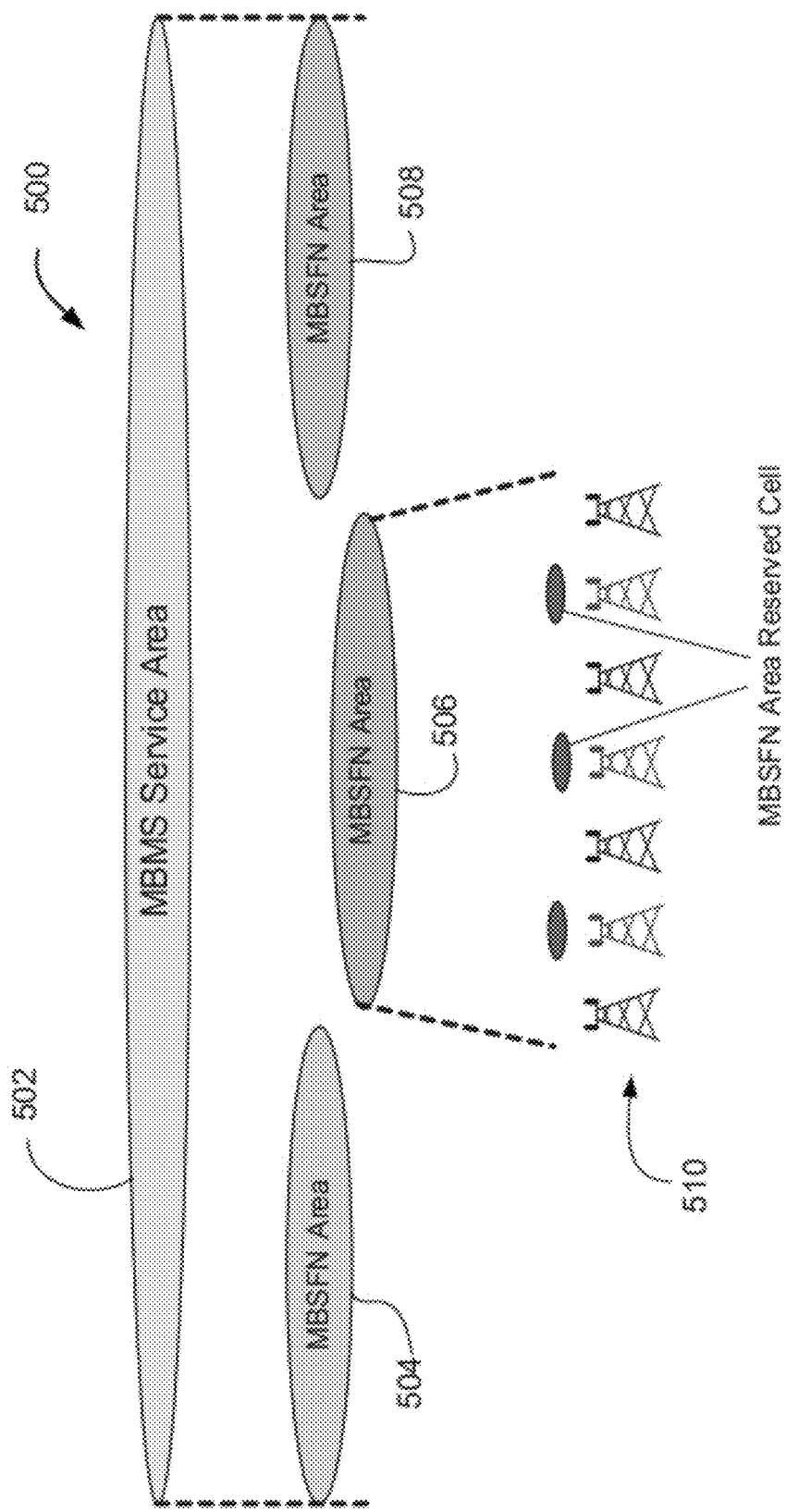
FIG. 5 is a diagram illustrating MBMS over a Single Frequency Network (MBSFN) areas within an MBSFN service area.

FIG. 5 illustrates a system 500 including an MBMS service area 502 encompassing multiple MBSFN areas 504, 506, 508, which themselves include multiple cells or base stations 510. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 504, 506 and 508. As used herein, an MBSFN area refers to a group of cells (e.g., cells 510) currently broadcasting a particular program in a synchronized fashion using an MBSFN protocol. An "MBSFN synchronization area" refers to a group of cells that are interconnected and configured in a way such that they are capable of operating in a synchronized fashion to broadcast a particular program using an MBSFN protocol, regardless of whether or not they are currently doing so. Each eNB can belong to only one MBSFN synchronization area, on a given frequency layer. It is worth noting that an MBMS service area 502 may include one or more MBSFN synchronization areas (not shown). Conversely, an MBSFN synchronization area may include one or more MBSFN areas or MBMS service areas. Generally, an MBSFN area is made up of all, or a portion of, a single MBSFN synchronization area and is located within a single MBMS service area. Overlap between various MBSFN areas is supported, and a single eNB may belong to several different MBSFN areas within a single synchronization area. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that that is not needed for MBSFN transmission because of its location.

eMBMS System Components and Functions

Figure 6:
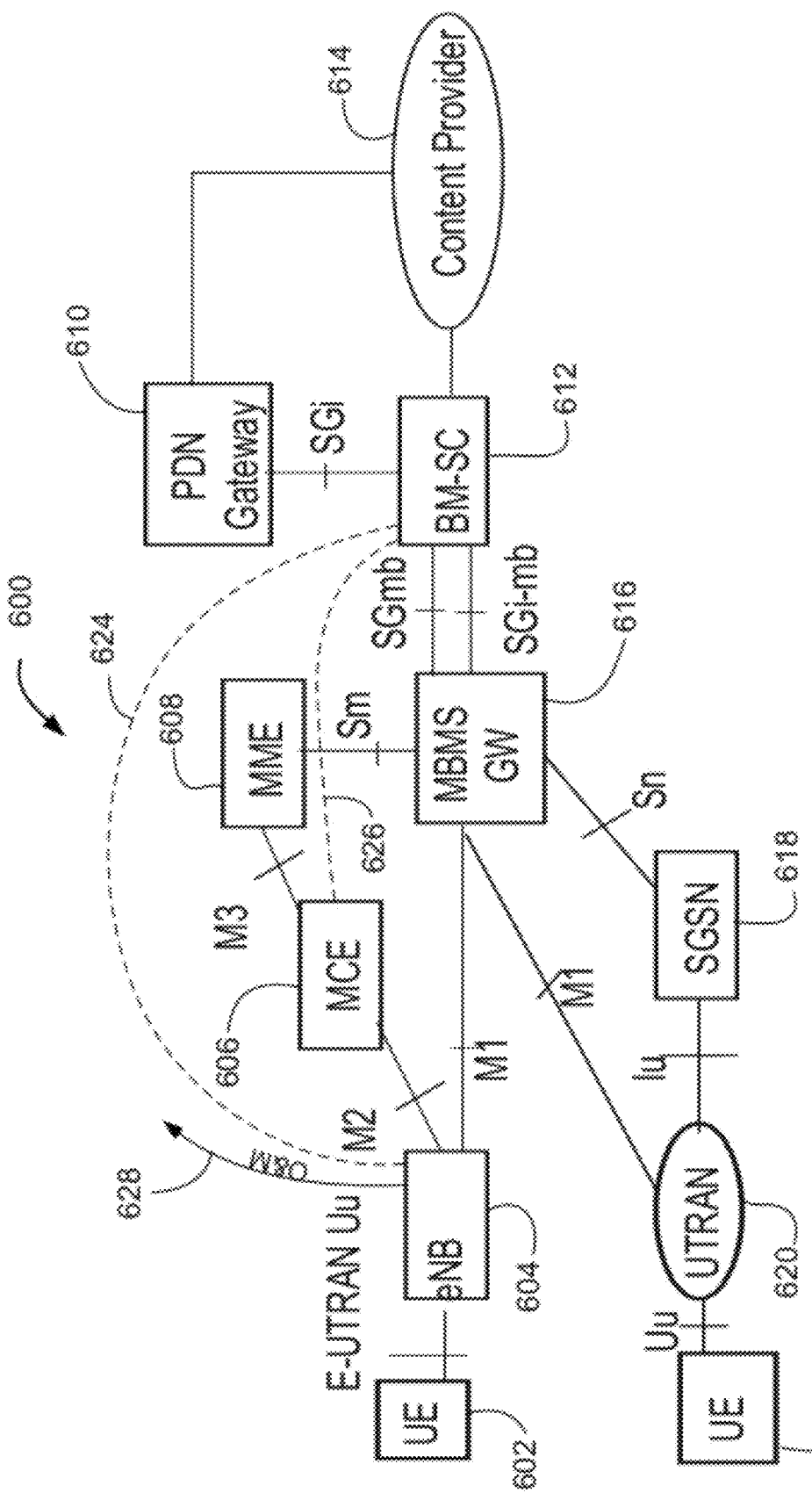
FIG. 6 is a block diagram illustrating components of a wireless communication system for providing or supporting MBSFN service.

FIG. 6 illustrates functional entities of a wireless communication system 600 for providing or supporting MBSFN service. Regarding Quality of Service (QoS), the system 600 may use a Guaranteed Bit Rate (GBR) type MBMS bearer, wherein the Maximum Bit Rate (MBR) equals the GBR. These components are shown and described by way of example, and do not limit the inventive concepts described herein, which may be adapted to other architectures and functional distributions for delivering and controlling multicast transmissions.

The system 600 may include an MBMS Gate Way (MBMS GW) 616. The MBMS GW 616 controls Internet Protocol (IP) multicast distribution of MBMS user plane data to eNodeBs 604 via an M1 interface, wherein "M1" refers to a logical interface as described by technical specifications for LTE and related specifications; one eNB 604 of many possible eNBs is shown. In addition, the MBMS GW controls IP multicast distribution of MBMS user plane data to UTRAN Radio Network Controllers (RNCs) 620 via an M1 interface; one UTRAN RNC 620 of many possible RNCs is shown. The M1 interface is associated to MBMS data (user plane) and makes use of IP for delivery of data packets. The eNB 604 may provide MBMS content to a UE/mobile device 602 via an E-UTRAN Uu interface, wherein "Uu" refers to an air interface as described by technical specifications for LTE and related specifications. The RNC 620 may provide MBMS content to a UE mobile device 622 via a Uu interface. The MBMS GW 616 may further perform MBMS Session Control Signaling, for example MBMS session start and session stop, via the Mobility Management Entity (MME) 608 and Sm interface, wherein "Sm" refers to a logical interface as described by technical specifications for LTE and related specifications. The MBMS GW 616 may further provide an interface for entities using MBMS bearers through the SG-mb (user plane) reference point, and provide an interface for entities using MBMS bearers through the SGi-mb (control plane) reference point, wherein "SG-mb" and "SGI-mb" refer to logical interfaces as described by technical specifications for LTE and related specifications. The SG-mb interface carries MBMS bearer service specific signaling. The SGi-mb interface is a user plane interface for MBMS data delivery. MBMS data delivery may be performed by IP unicast transmission, which may be a default mode, or by IP multicasting. The MBMS GW 616 may provide a control plane function for MBMS over UTRAN via a Serving General Packet Radio Service Support Node (SGSN) 618 and the Sn/Iu interfaces.

The system 600 may further include a Multicast Coordinating Entity (MCE) 606. The MCE 606 may perform an admission control function for MBMS content, and allocate time and frequency radio resources used by all eNBs in the MBSFN area for multi-cell MBMS transmissions using MBSFN operation. The MCE 606 may determine a radio configuration for an MBSFN Area, such as, for example, the modulation and coding scheme. The MCE 606 may schedule and control user plane transmission of MBMS content, and manage eMBMS service multiplexing, by determining which services are to be multiplexed in which Multicast Channel (MCH). The MCE 606 may participate in MBMS Session Control Signaling with the MME 608 through an M3 interface, and may provide a control plane interface M2 with the eNB 604, wherein "M2" and "M3" refer to logical interfaces as described by technical specifications for LTE and related specifications.

The system 600 may further include a Broadcast-Multicast Service Center (BM-SC) 612 in communication with a content provider server 614. The BM-SC 616 may handle intake of multicast content from one or more sources such as the content provider 614, and provide other higher-level management functions as described below. These functions may include, for example, a membership function, including authorization and initiation of MBMS services for an identified UE. The BM-SC 616 may further perform MBMS session and transmission functions, scheduling of live broadcasts, and delivery, including MBMS and associated delivery functions. The BM-SC 616 may further provide service advertisement and description, such as advertising content available for multicast. A separate Packet Data Protocol (PDP) context may be used to carry control messages between a UE and the BM-SC. The BM-SC may further provide security functions such as key management, manage charging of content providers according to parameters such as data volume and QoS, provide content synchronization for MBMS in UTRAN and in E-UTRAN for multicast broadcast mode, and provide header compression for MBSFN data in UTRAN. The BM-SC 612 may indicate session start, update and stop to the MBMS-GW 616 including session attributes such as QoS and MBMS service area.

The system 600 may further include a Multicast Management Entity (MME) 608 in communication with the MCE 606 and MBMS GateWay (GW) 616. The MME 608 may provide a control plane function for MBMS over E-UTRAN. In addition, the MME may provide the eNB 604 with multicast related information defined by the MBMS-GW 616. An Sm interface between the MME 608 and the MBMS-GW 616 may be used to carry MBMS control signaling, for example, session start and stop signals.

The system 600 may further include a Packet Data Network (PDN) Gate Way (GW) 610, sometimes abbreviated as a P-GW. The P-GW 610 may provide an Evolved Packet System (EPS) bearer between the UE 602 and BM-SC 612 for signaling and/or user data. As such, the P-GW may receive Uniform Resource Locator (URL) based requests originating from UEs in association with IP addresses assigned to the UEs. The BM-SC 612 may also be linked to one or more content providers via the P-GW 610, which may communicate with the BM-SC 612 via an IP interface.

The system may include new interfaces enabling direct communications between certain system components, to facilitate aspects of the methods and apparatus disclosed herein. For example, a direct interface 624 may be provided between the eNB 604 and the BM-SC 612. For further example, a direct interface 626 may be provided between the MCE 606 and the BM-SC 612. The eNB 604 may also be indirectly linked to various system components, including but not limited to the BM-SC, via an Operations and Maintenance (O&M) link 628.

Dynamic Adaptive Streaming Over HTTP (DASH)

Dynamic adaptive streaming in unicast transmissions is described in 3GPP2 TS 26.247 v. 1.3.0 (2011-03) "Dynamic Adaptive Streaming over HTTP (3GP-DASH)." DASH as described in the foregoing document operates at the mobile device level by selection of a video bit rate, resolution, or other quality factor based on the mobile device's own observed Quality of Service (QoS) for the unicast connection over which a media component is being received. The mobile entity indicates its desired service quality based on its own hardware configuration and the unicast QoS. A network entity controlling the service quality of the unicast transmission, for example, a BM-SC, responds to the indication from the mobile entity to provide a requested service quality, e.g., video or audio bit rate, resolution, display size, or the like. This adaptive streaming capability is designed to be dynamic, meaning that the service quality can be adjusted during a unicast transmission; for example, service quality can be adjusted at a specified frame boundary or time as the unicast Signal-to-Noise Ratio (SNR) varies due to movement of the mobile device or other factors, or to support transfer of a unicast media session to an alternative wireless device. In general, DASH as conceived for unicast service relies on a feedback mechanism from the mobile device to the one or more network entities that control the service quality of the unicast transmission. The network entity controlling service quality may reside outside of the wireless communication system providing unicast transport; for example, in a connected network.

Dynamic Adaptive QoS Control in Multicast

DASH as developed for unicast transmissions generally cannot be deployed to control quality of service for multicast transmissions, for several reasons. In a multicast broadcast context, selection of a service quality at the mobile device level is not useful or feasible, because the service quality that is possible or desirable for one mobile device may not be possible or desirable for other mobile devices receiving the same multicast transmission from the same source. For this and other reasons, in the multicast broadcast context, the network infrastructure should control selection of multicast broadcast data quality. In addition, current multicast protocols lack an established interface or signal pathway for feedback from the mobile device level to the multicast control level for conveying information about multicast service quality after a multicast session begins. Instead, service quality is fixed at the initiation of each multicast session and does not change during the multicast transmission. For example, in eMBMS, streaming content is delivered using a separate flow that uses Real-Time transport Protocol (RTP) as the transport protocol. In RTP, applicable streaming parameters are delivered to the client device prior to the start of the streaming session, and these parameters are not modified after the streaming session starts. For these and other reasons, system operators and designers lack any clear motivation, reason, or technical method for providing a dynamic adaptive QoS capability in multicast transmissions.

However, surprising benefits may be obtained by adapting a type of dynamic adaptive service for multicast transmissions. Such benefits may include, for example, providing more optimal multicast service quality based on network load factors, including adjusting QoS based on changes in network load factors during the course of a multicast transmission. Multicast network load factors may include, for example: system bandwidth; multicast (e.g., MBSFN) area characteristics, for example, average cell radius and number of cells in a multicast area; interference level from transmitters outside of the multicast area; unicast load or demand; and number of concurrent multicast services demanded. System bandwidth and area characteristics may be relatively static in nature for a given MBSFN area or similar multicast area. However, the remaining network load factors may be quite dynamic (time-varying). Interference may vary due to varying loads in a neighboring area. Demand for unicast services may vary based on time-of-day, day-of-week, and/or special events. The number of concurrent multicast services may likewise vary. For example, special events or new releases of content (e.g., new game or video release) may concentrate demand for content in certain areas at certain times, while at other times more numerous but less individually popular content is available via multicast. When more numerous and diverse selections of multicast sessions are available, bandwidth available for each concurrent session will decrease if aggregate available bandwidth does not increase in proportion to the increase in concurrent multicast sessions. The converse occurs when fewer concurrent multicast sessions are available. In addition, the network may allocate differently-sized shares of available bandwidth to different concurrent multicast services for a variety of reasons, including but not limited to content type and target device type.

Therefore, bandwidth available for multicast transmission can vary substantially within a multicast area, even within relatively short time periods within the duration of a multicast session. For example, as the number of multicast programs in an area decreases coupled with a decrease in use of unicast services, bandwidth available for certain individual multicast services may increase above baseline levels within a multicast area. Similarly, available bandwidth for a multicast program may decrease as the number of available multicast programs increases and/or unicast usage increases. In either situation, it may be desirable to change the QoS for a streaming multicast program after the multicast session has been initiated to enable reallocation of radio resources to or from one or more multicast sessions. Current protocols as defined by DASH require the client (mobile device) to request the QoS, implying that the mobile device has an uplink channel allocated on which the mobile device may communicate its desired QoS media stream segment from the server. But, as described above, a multicast network generally operates as a unidirectional channel from the network to the mobile device, with no corresponding uplink channel for communicating a desired QoS.

Figure 7:
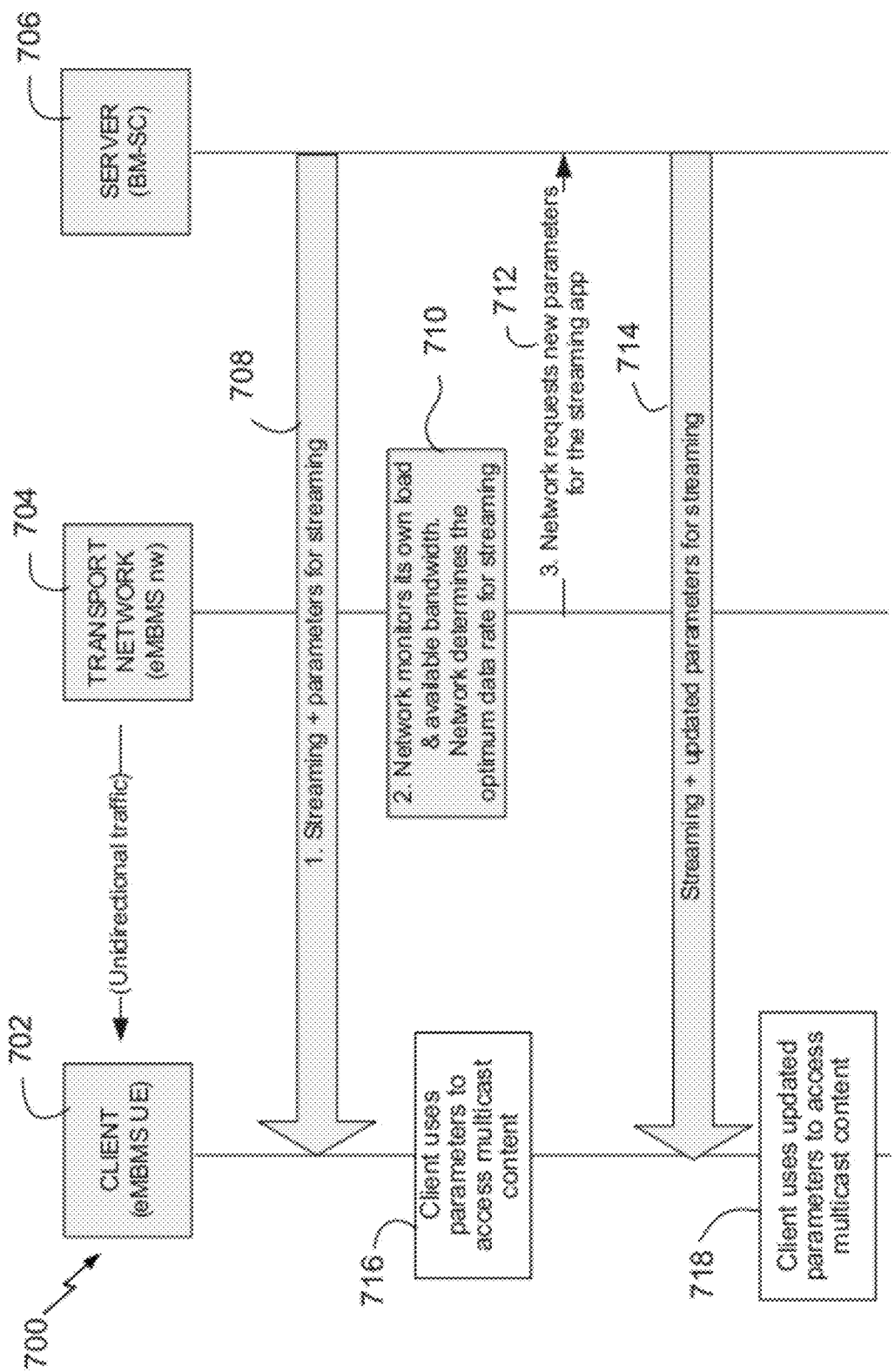
FIG. 7 illustrates an embodiment of a network-level call flow for QoS control in a multicast transmission of a wireless communications system.

General system-level aspects of dynamic adaptive QoS in a multicast transmission are illustrated by FIG. 7, showing an embodiment of a network-level call flow 700 for QoS control in a multicast transmission. The depicted call flow may require changes to existing protocol for eMBMS or other broadcast/multicast protocols. The system 600 as shown in FIG. 6 may be used to dynamically adapt QoS for an eMBMS or other multicast session in an MBMS area as shown in FIG. 7, including a BM-SC 706, one or more intermediate nodes 704 generally described as a transport network, and a client 702, for example a mobile device. However, the systems and methods disclosed herein are not limited to eMBMS or MBMS implementation, and may be implemented in other wireless technologies.

Initially, a BM-SC 706 may initiate 708 a multicast session in which content is streamed via a multicast session with initial QoS parameters for setting up the session on the client side. A multicast session may also be referred to as a multicast transmission or multicast broadcast, and should generally by understood as existing between definite initiation and termination events; accordingly, a multicast session/transmission should be understood as having a discernable duration. Generally for multicast broadcast protocols (e.g., MBMS or eMBMS), multicast traffic is unidirectional to the client (downlink only). Any client within range of the transport network wireless transmitters may receive the initial multicast transmission 708, and generally multiple clients will receive the multicast transmission. For illustrative simplicity, a single client 702 is depicted. At 716, the client uses the QoS parameters received from the BM-SC 706 via the transport network 704 to access the multicast content. Meanwhile, at 710, the transport network monitors its own load and available bandwidth. The network 704 may continue to determine an optimum data rate during the streaming multicast session 708 while the multicast session is in progress. The "optimum" rate may be based on balancing competing resource demands subject to dynamic and/or static constraints and resource limitations; for example, determining the highest data rate that existing and/or anticipated resource constraints can effectively support. In the alternative, or in addition, the BM-SC 706 may determine an optimum data rate or participate in such determination. At 712, the transport network 704 may provide a signal to the BM-SC 706 responsive to its determination at 710. To continuously update the BM-SC about the latest network loading conditions, the signal may be sent many times during the multicast session. The signal may indicate network load factors, available multicast bandwidth, or both to the BM-SC. In the alternative, or in addition, the signal may indicate a desired optimum data rate or other adapted QoS parameter for the multicast session, depending on where decision making functionality is distributed. The BM-SC may receive the signal and generate updated QoS parameters for the multicast session. At 714, the BM-SC may send the updated parameters with the continuing content for the multicast session via the transport network to multicast broadcast recipients, e.g., client 702. At 718, the client 702 uses the updated QoS parameters to access the multicast content.

Current multicast protocols do not support providing updated QoS parameters to the client after a multicast session is initiated, as indicated at 714. New methods and apparatus for providing updated QoS parameters are disclosed herein. Similarly, network load monitoring as indicated at 710 and signaling network load factors or available bandwidth to a BM-SC or similar entity as indicated at 712 may be enabled by the examples of new methodologies and apparatus disclosed below.

The BM-SC may be positioned upstream of the MBMS Gateway, and may be a suitable candidate for implementing QoS control aspects of the methods described herein. In such case, the BM-SC may update QoS per multicast service based on MBSFN load factors. The BM-SC may use an updated QoS to request a different video bit rate or resolution from a content provider. The content provider may provide content with the requested QoS for multicast transmission in accordance with the request of the BM-SC. Alternatively, for each flow, multiple streams may be sent to the BM-SC and the BM-SC may choose an appropriate stream for each MBSFN area, for example a stream that best matches a requested QoS in the area. The BM-SC may propagate the updated QoS to the MCE for the applicable MBSFN area. The MCE may then schedule MBMS resources for each multicast service, including an updated Modulation Coding Scheme (MCS) and number of subframes allocated for each multicast service. The eNBs within the applicable MBSFN area may be updated using a System Information Block (SIB) 13, MCCH or Multicast Transport Channel (MTCH) transmission. The UE may decode the multicast service using the updated Physical Multicast Channel (PMCH) parameters.

Example Methodologies and Apparatus

Methodologies that may be implemented in accordance with the disclosed subject matter may be better appreciated with reference to various flow charts. For purposes of simplicity of explanation, methodologies are shown and described as a series of acts/operations. However, the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Network Entity/BM-SC

FIGS. 8A-F illustrate related methodologies for dynamically controlling Quality-of-Service (QoS) for a multicast transmission from a network entity of a wireless communications system (WCS). The multicast transmission may be broadcast so that multiple mobile devices may receive it. The network entity may comprise a BM-SC as shown at 706 of FIG. 7. The multicast protocol may be downlink only, such that any mobile device receiving the multicast transmission does not provide feedback to the BM-SC. Method 800 shown in FIG. 8A may include, at 802, initiating a multicast transmission having an initial QoS. The network entity may define the QoS using parameters such as bit rate, media type, resolution, frame rate, or other parameters related to bandwidth required for the multicast transmission. The method 800 may further include, at 804, one or more network entities generating an updated QoS for the multicast transmission, in response to a network load factor for a multicast area. The updated QoS may replace the initial QoS, in that the multicast transmission may be transmitted at the new QoS prior to termination. Updating the QoS, in general, includes changing the QoS for the multicast transmission during the multicast session, without initiating a new multicast session. In such cases, the mobile devices may need to obtain information describing the updated QoS to be able to continue to use subsequent multicast content in the session. The updated QoS may require a different bandwidth than the initial QoS, and may be configured for updating the initial QoS during the multicast transmission. Therefore mobile entities may receive and access an initial portion of the multicast transmission using a first QoS, and subsequently receive and access a second portion of the multicast transmission using a second QoS different from the initial QoS. In this sense, the network entity may be described as dynamically controlling the QoS for the multicast transmission.

Additional operations 850 for effecting an update of the QoS are illustrated in FIG. 8B, for performance by the network entity. One or more of operations 850 may optionally be performed as part of method 800. The operations 850 may be performed in any operative order, or may be encompassed by a development algorithm without requiring a particular chronological order of performance. Operations may be independently performed and not mutually exclusive. Therefore any one of such operations may be performed regardless of whether another downstream or upstream operation is performed. For example, if the method 800 includes at least one of the operations 850, then the method 800 may terminate after the at least one operation, without necessarily having to include any subsequent downstream operation(s) that may be illustrated.

The additional operations 850 may include, at 805, updating the multicast transmission using the updated QoS. For example, the network entity may cause the content being streamed in the multicast transmission to be formatted and transmitted according to the new QoS. For example, the new QoS may have a different resolution, frame rate, or so forth. This operation 805 may be performed in cooperation with a content server for the multicast content. The operations 850 may further include, at 806, indicating the updated QoS to a mobile entity receiving the multicast transmission. Various modes for providing this indication are described below, each of which may be used to provide parameter information from the controlling network entity to the client mobile devices. The multicast transmission protocols in use may be configured such that the network entity does not receive feedback from the mobile entity, as indicated at block 808. Block 808 illustrates that the entire method 800, including any additional aspects or operations 850 or 860, may optionally be performed by the network entity without receiving any feedback from the mobile device; for example, the method may exclude receiving feedback from the mobile device. In general, indicating the updated QoS 806 may comprise providing parameters for streaming a media component to the mobile entity, as indicated at block 810. Parameters may include, for example: a protocol ID; a media type; a data rate, optionally using existing SDP bandwidth modifiers; a mode of MBMS bearer per media; FEC configuration and related parameters; service language(s) per media; Quality of Experience (QoE) metrics, for example as defined in 3GPP TS 26.346 at 8.3.2.1 and 8.4; a QoS Class Identifier (QCI); an Allocation Retention Priority; a Maximum Bit Rate (MBR); optionally a Guaranteed Bit Rate (GBR); or other parameter data.

As shown in FIG. 8C, the additional operations 850 may include, according to a first alternative at 812, indicating the updated QoS 806 by specifying, in an announcement, new ones of the parameters taking effect at a specified frame boundary or time. The announcement may be made using a service announcement procedure. The frame boundary or time may relate to a frame or timeline point of the multicast content. The additional operations 850 may further include, at 814, generating the announcement in connection with corresponding planned changes in the QoS. For example, the network entity may generate a service announcement for each upcoming QoS update. Blocks 816-818 relate to alternative or complementary operations for transmitting a service announcement. The additional operations 850 may further include, at 816, transmitting the announcement according to a Session Description Protocol (SDP) or a modified SDP. In the alternative, or in addition, the additional operations 850 may further include, at 818, transmitting the announcement according to a File Description Table (FDT) or a modified FDT.

As shown in FIG. 8D, the additional operations 850 may include, according to a second alternative at 820, indicating the updated QoS 806 by sending the parameters in a corresponding control stream. The corresponding control stream may be multicast concurrently with the primary multicast transmission. That is, the corresponding control stream may comprise a second, or parallel, multicast transmission that includes data related to the first multicast transmission that is being dynamically controlled. The corresponding stream may comprise a low bit rate stream dedicated for QoS and optionally other control data correlated to the media stream. During periods when the QoS is not being updated, e.g., in between updates, the corresponding control stream may comprise null data or meaningless data that can be ignored by receiving clients. To reduce overhead required by corresponding control streams, QoS updates for more than one multicast transmission may be broadcast using a single aggregated control stream.

As shown in FIG. 8E, the additional operations 850 may include, according to a second alternative at 822, indicating the updated QoS by including the parameters in headers of a stream transport protocol for the multicast transmission. As indicated at blocks 823-824, the stream transport protocol may comprise an HTTP push protocol. In an alternative 823, the operations 850 may include, at 824, configuring the stream transport protocol as a modified autonomous HTTP push protocol. Existing HTTP push protocol requires using TCP with a bidirectional channel. In the modified HTTP push protocol, server-side events may be used for content delivery autonomously sent to the mobile device. The HTTP push protocol may use the HTTP headers as currently defined, but the modified transport protocol may use a unidirectional transport protocol such as User Datagram Protocol (UDP). In addition the modified HTTP push protocol may not require a request from the mobile device. According to another alternative 823, the operations 850 may include, at 825, not configuring the stream transport protocol as an HTTP push protocol. In this case, a stream transport protocol may need to be modified to include the desired parameters in transport headers.

Figure 8F:
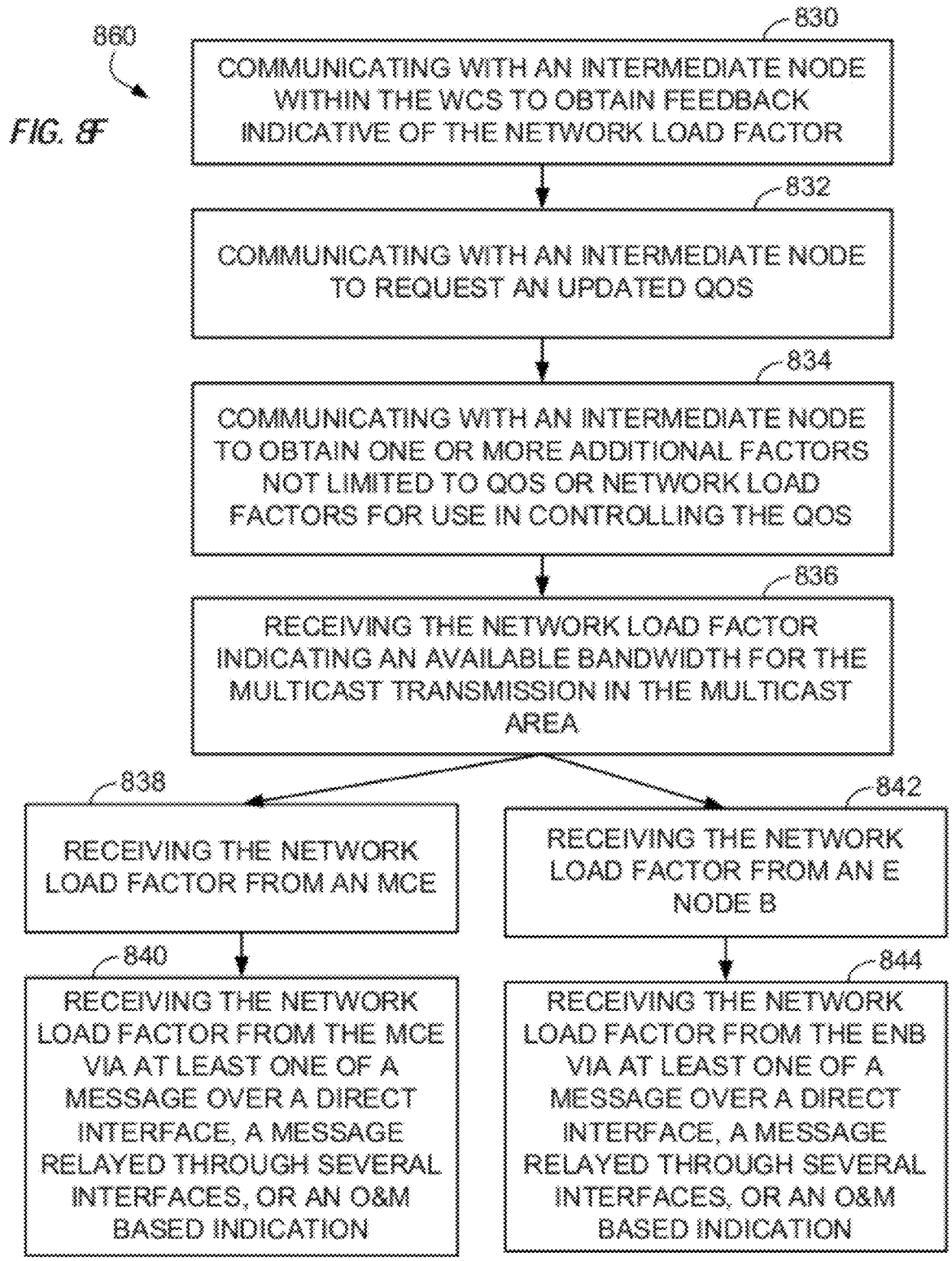

Additional operations for 860 for effecting an update of the QoS are illustrated in FIG. 8F, for performance by the network entity. One or more of operations 860 may optionally be performed as part of method 800. One or more of operations 860 may optionally be performed as part of method 800. The elements 860 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 800 includes at least one of the operations 860, then the method 800 may terminate after the at least one operation, without necessarily having to include any subsequent downstream operation(s) that may be illustrated.

Operations 860 may include, at 830, communicating with an intermediate node within the WCS to obtain feedback indicative of the network load factor. Here, "indicative of a network load factor" should be understood to include data indicative of one or more network load factors, or of available bandwidth for multicast, or of a desired bandwidth allocation or quality of service. Accordingly, as illustrated at 832, the operations 860 may include communicating with an intermediate node to obtain an updated QoS. In the alternative, or in addition, as illustrated at 834, the operations 860 may include communicating with an intermediate node to obtain one or more additional factors not limited to QOS or network load factors for use in controlling the QoS. Additional factors may include, for example, schedule information for eMBMS programming, a program-specific QoS, or other information. In the alternative, or in addition, as illustrated at 836, the operations 860 may include receiving the network load factor, wherein the network load factor indicates an available bandwidth for the multicast transmission in the multicast area. As used herein, an "intermediate node" means a node of a transport network intermediate between the network entity controlling the multicast QoS and the client level (e.g., UE 702), for example, a node of the transport network 704.

An intermediate node may include, for example, an MCE or eNB. A new message may be added to the M2 interface to indicate bandwidth availability. The MCE may use feedback from each eNB in an MBSFN or other multicast area to estimate a bandwidth allocation for a multicast transmission. Different multicast areas may transmit the same content using different QoS parameters; for example, the current QoS may be different in different areas for the same streaming content (e.g., a specific video program streamed to different areas at different QoS). Accordingly, the operations 860 may include, at 838, receiving the network load factor from a Multicast Coordinating Entity (MCE). In such case, the operations 860 may include, at 840, receiving the network load factor from the MCE via at least one of a message over a direct interface, a message relayed through several interfaces, or an Operations & Maintenance based indication. In the alternative, or in addition, the operations 860 may include, at 842, receiving the network load factor directly from an eNode B (eNB). In such case, the operations 860 may likewise include, at 844, receiving the network load factor from the eNB via at least one of a message over a direct interface, a message relayed through several interfaces, or an Operations & Maintenance based indication. A new message may be added to the M1/SGi-mb interfaces to indicate load factors, e.g., bandwidth availability.

Figure 9:
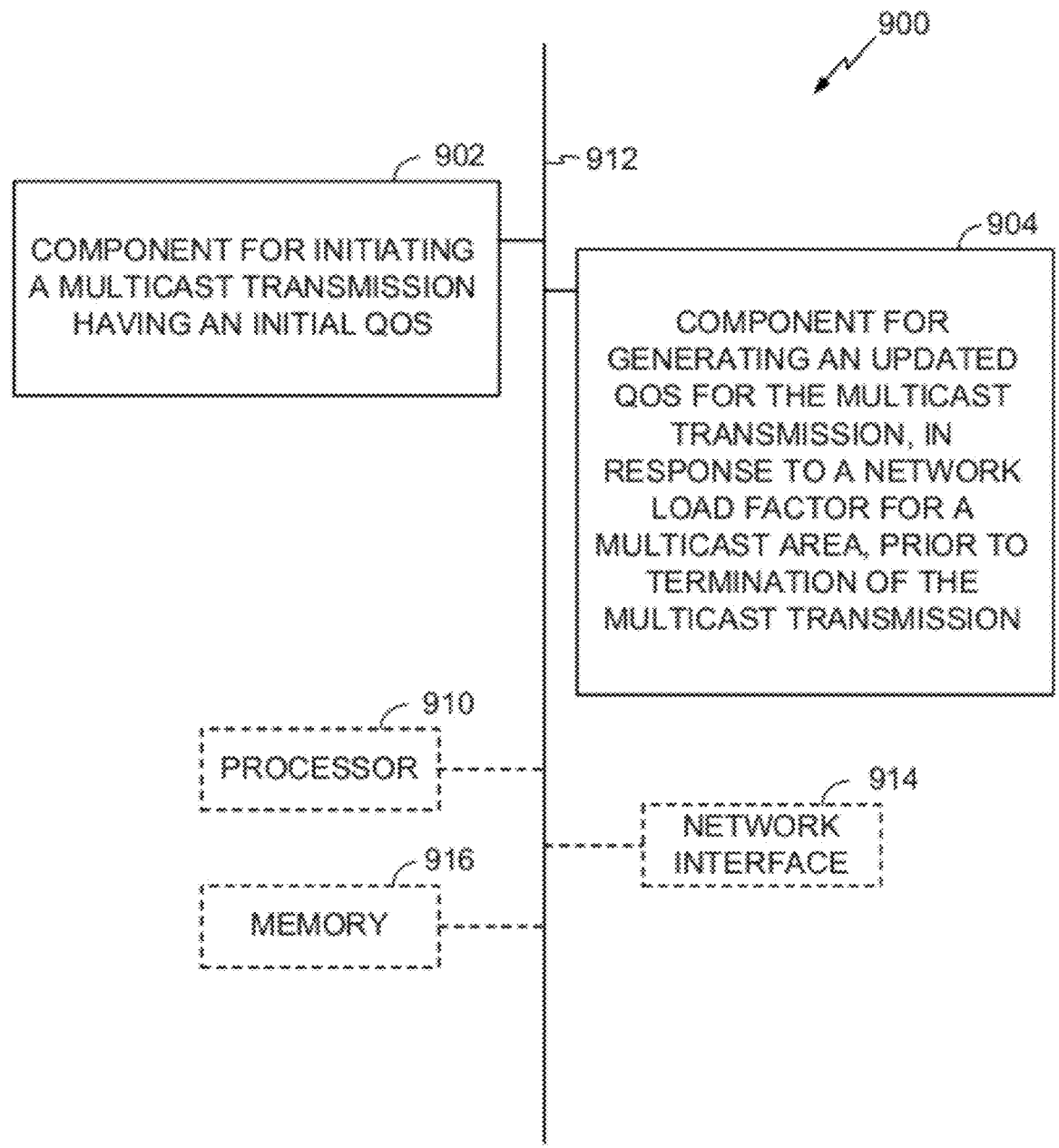
FIG. 9 illustrates an example of an apparatus for implementing the methodologies of FIGS. 8A-F.

With reference to FIG. 9, there is provided an exemplary apparatus 900 that may be configured as BM-SC in a wireless network, or as a processor or similar device for use within the BM-SC, for providing dynamic adaptable multicast services. The apparatus 900 may include functional blocks that can represent functions implemented by a processor, software, or combination thereof (e.g., firmware).

As illustrated, in one embodiment, the apparatus 900 may include an electrical component or module 902 for initiating a multicast transmission having an initial QoS. For example, the electrical component 902 may include at least one control processor coupled to a network interface or the like and to a memory with instructions for initiating a multicast transmission in cooperation with a transport network. The electrical component 902 may be, or may include, means for initiating a multicast transmission having an initial QoS. Said means may include an algorithm executed by one or more processors. The algorithm may include, for example, providing instructions for a multicast transmission via a network interface to base stations in a multicast area, and including in, or with, the instructions at least one QoS parameter to be used by the base stations for implementing the multicast transmission as a multicast session over an air interface.

The apparatus 900 may include an electrical component 904 for generating an updated QoS for the multicast transmission, in response to a network load factor for a multicast area, for updating the initial QoS prior to termination of the multicast transmission. For example, the electrical component 904 may include at least one control processor coupled to a memory holding instructions for generating an updated QoS during the multicast transmission in response to feedback received from one or more components of the transport network. The electrical component 904 may be, or may include, means for generating an updated QoS for the multicast transmission, in response to a network load factor for a multicast area, prior to termination of the multicast transmission. Said means may include an algorithm executed by one or more processors. The algorithm may include, for example, measuring a network load factor, detecting a change in the network load factor, and determining an updated value for at least one QoS parameter based on the network load factor, in response to detecting the change in the network load factor. The algorithm may further include transmitting the updated value of the at least one QoS parameter (i.e., the updated QoS) to the base stations in the multicast area for updating the QoS of the multicast session over the air interface by replacing an initial QoS of the session with an updated QoS and transmitting the multicast transmissions using the updated QoS. The apparatus 900 may include similar electrical components for performing any or all of the additional operations 850 and 860 described in connection with FIGS. 8B-F, which for illustrative simplicity are not shown in FIG. 9.

In related aspects, the apparatus 900 may optionally include a processor component 910 having at least one processor, in the case of the apparatus 900 configured as a network entity. The processor 910, in such case, may be in operative communication with the components 902-904 or similar components via a bus 912 or similar communication coupling. The processor 910 may effect initiation and scheduling of the processes or functions performed by electrical components 902-904.

In further related aspects, the apparatus 900 may include a network interface component 914 for communicating with other network entities, for example, an Ethernet port or wireless interface. The apparatus 900 may optionally include a component for storing information, such as, for example, a memory device/component 916. The computer readable medium or the memory component 916 may be operatively coupled to the other components of the apparatus 900 via the bus 912 or the like. The memory component 916 may be adapted to store computer readable instructions and data for performing the activity of the components 902-904, and subcomponents thereof, or the processor 910, the additional operations 850 or 860, or the methods disclosed herein. The memory component 916 may retain instructions for executing functions associated with the components 902-904. While shown as being external to the memory 916, it is to be understood that the components 902-904 can exist within the memory 916.

Mobile Device

Figure 10:
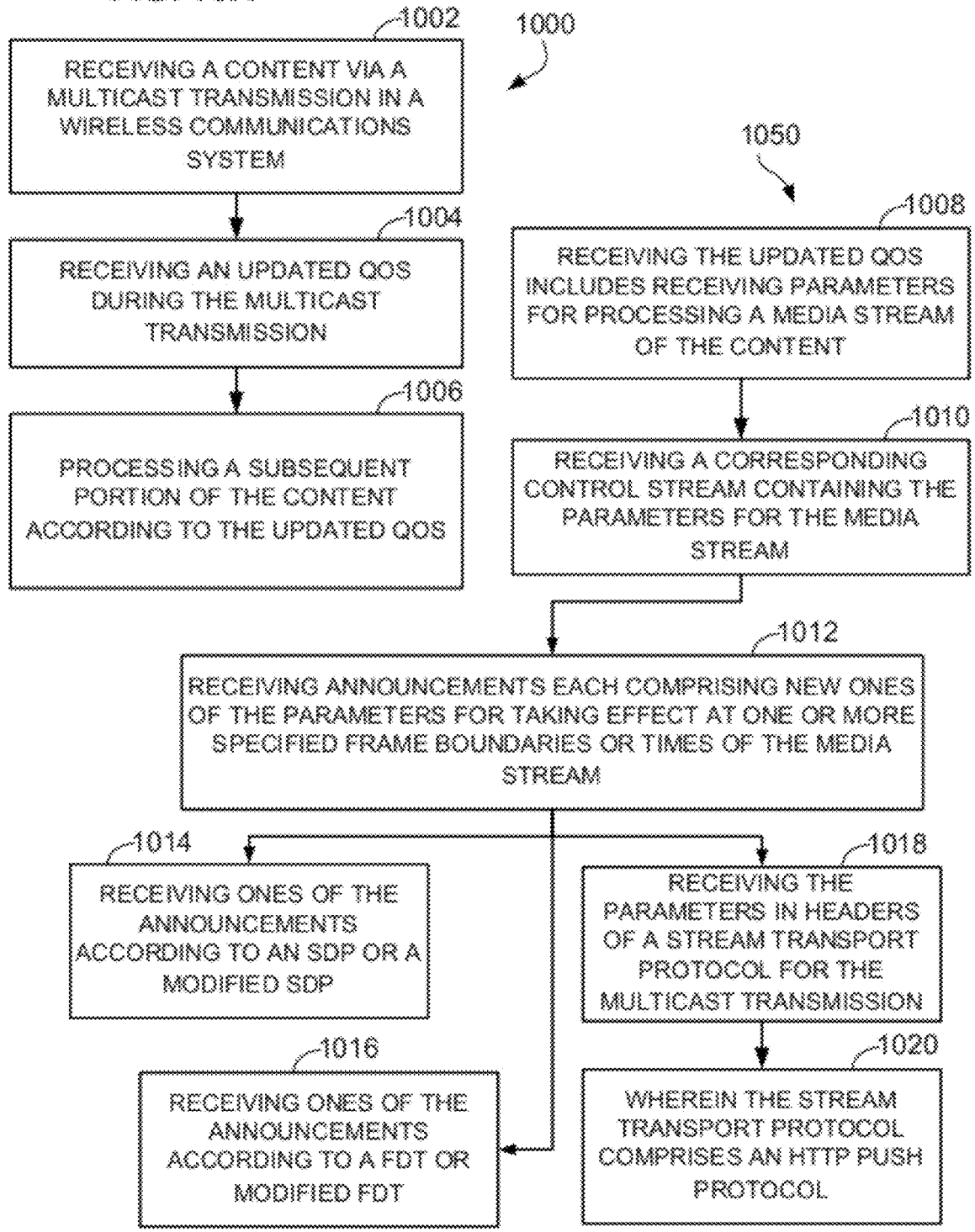
FIGS. 10A-B illustrate embodiments of a methodology for using a multicast transmission configured for dynamic QoS control at a mobile device.

A mobile device may be configured to use dynamically updated QoS information to access portions of a multicast transmission. Accordingly, FIG. 10A illustrates a method 1000 that may be performed by a mobile device of a wireless communications system, for receiving and using a multicast transmission having a dynamically controlled Quality-of-Service (QoS). The method 1000 may include, at 1002, receiving a content, for example streaming content, via a multicast transmission in a wireless communications system. The multicast transmission may be received having an initial QoS, and the method 1000 may include processing an initial portion of the content using the initial QoS. Method 1000 may further include, at 1004, receiving an updated QoS during the multicast transmission, wherein the updated QoS is different from the initial QoS. Method 1000 may further include, at 1006, processing a subsequent portion of the content according to the updated QoS.

In addition, FIG. 10B shows further optional elements 1050 that may be implemented for use by the mobile device in using a dynamically configured multicast transmission. The elements 1050 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1000 includes at least one operation of FIG. 10B, then the method 1000 may terminate after the at least one operation, without necessarily having to include any subsequent downstream operation(s) that may be illustrated.

The additional elements 1050 may include, at 1008, the mobile device receiving the updated QoS including receiving parameters for processing a media stream of the content. Parameters may include, for example: a protocol ID; a media type; a data rate, optionally using existing SDP bandwidth modifiers; a mode of MBMS bearer per media; FEC configuration and related parameters; service language(s) per media; QoE metrics, for example as defined in 3GPP TS 26.346 at 8.3.2.1 and 8.4; a QCI; an Allocation Retention Priority; an MBR; and/or optionally a GBR. The additional elements 1050 may further include, at 1010, receiving the parameters at the mobile device by receiving a corresponding control stream containing the parameters for the media stream. For example, as noted above, the corresponding control stream may be broadcast through the WCS from a multicast controlling entity. In the alternative, the additional elements 1050 may further include, at 1012, the mobile device receiving the parameters by receiving announcements each comprising new ones of the parameters for taking effect at one or more specified frame boundaries or times of the media stream. The elements 1050 may therefore include, at 1014, receiving ones of the announcements according to an SDP or modified SDP. In the alternative, the elements 1050 may include, at 1016, receiving ones of the announcements according to a FDT or modified FDT.

In a further alternative, the elements 1050 may include, at 1018, the mobile entity receiving the parameters in headers of a stream transport protocol for the multicast transmission. In such case, the elements 1050 may include, at 1020, receiving the parameters in headers of the stream transport protocol wherein the stream transport protocol comprises an HTTP push protocol.

Figure 11:
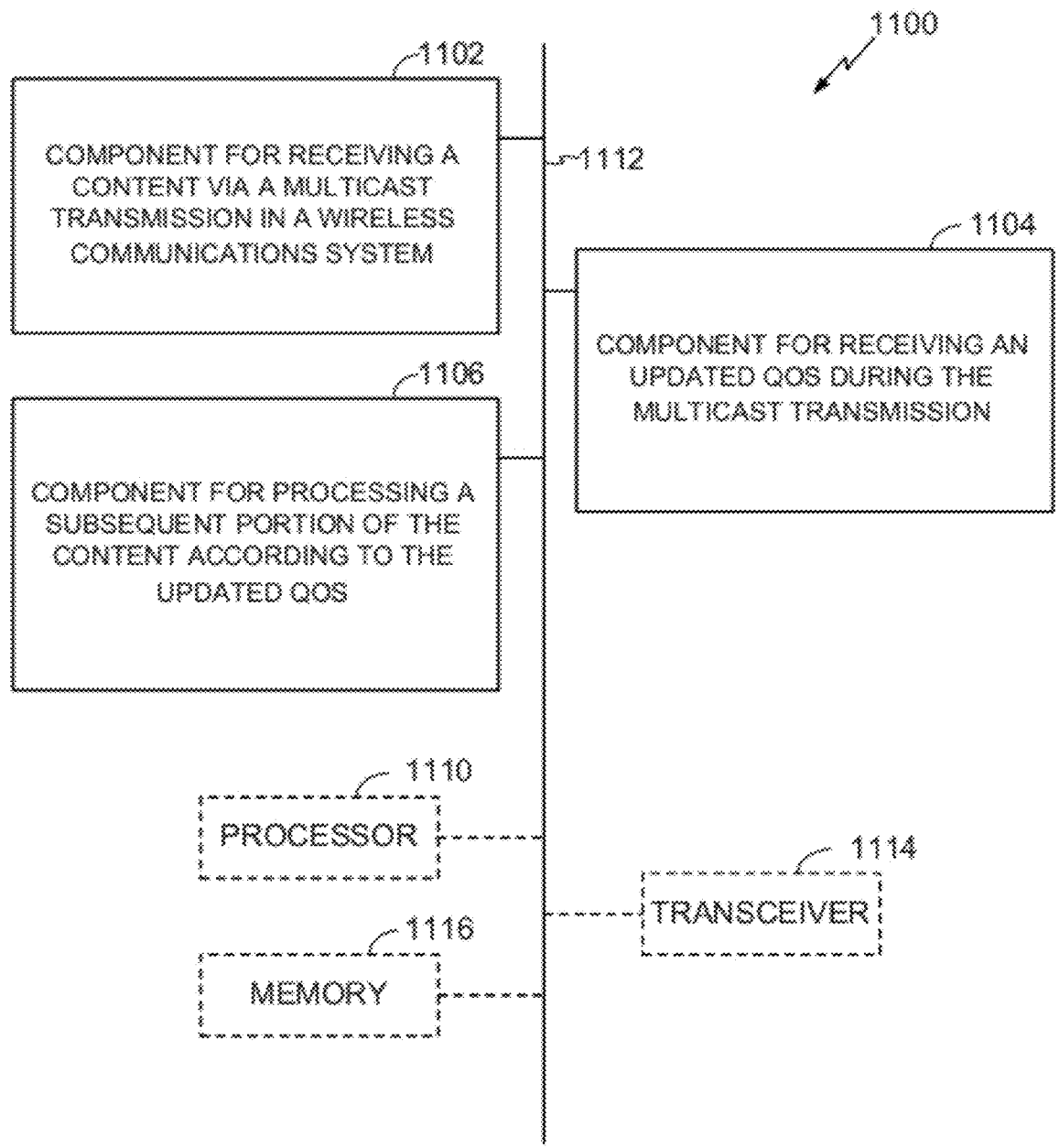
FIG. 11 illustrates an example of an apparatus for implementing the methodologies of FIGS. 10A-B.

With reference to FIG. 11, there is provided an exemplary apparatus 1100 that may be configured as a mobile device in a wireless network, or as a processor or similar device for use within the mobile device, for using a multicast transmission with dynamic adaptable QoS. The apparatus 1100 may include functional blocks that can represent functions implemented by a processor, software, or combination thereof (e.g., firmware).

As illustrated, in one embodiment, the apparatus 1100 may include an electrical component or module 1102 for receiving a content, for example streaming content, via a multicast transmission in a wireless communications system. For example, the electrical component 1102 may include at least one control processor coupled to a transceiver or the like and to a memory with instructions for receiving and using multicast content. The electrical component 1102 may be, or may include, means for receiving a content, for example streaming content, via a multicast transmission in a wireless communications system. Said means may include an algorithm executed by one or more processors. The algorithm may include, for example, receiving control information for decoding multicast symbols from a control channels, receiving radio frames over a wireless interface, and decoding data from the radio frames using the control information to obtain the content.

The apparatus 1100 may further include an electrical component 1104 for receiving an updated QoS during the multicast transmission. For example, the electrical component 1104 may include at least one control processor coupled to a transceiver or the like and to a memory holding instructions for receiving and recognizing an updated QoS according to one or more of the operations described herein. The electrical component 1104 may be, or may include, means for receiving an updated QoS during the multicast transmission. Said means may include an algorithm executed by one or more processors. The algorithm may include, for example, one or more of the operations 1050 described in connection with FIG. 10B.

The apparatus 1100 may further include an electrical component 1106 for processing a subsequent portion of the content according to the updated QoS. For example, the electrical component 1106 may include at least one control processor coupled to a transceiver or the like and to a memory holding instructions for processing a multicast session to provide a media output, for example streaming audio-video output for display on a display device. The electrical component 1106 may be, or may include, means for processing a subsequent portion of the content according to the updated QoS. Said means may include an algorithm executed by one or more processors. The algorithm may include, for example, determining a point in a received sequence of radio frames at which the updated QoS applies, and processing received data according to the updated QoS after that point. For example, if the updated QoS includes an updated frame rate or video resolution, the mobile entity may process video data received after the QoS changes to provide video output at the new frame rate and/or resolution. The apparatus 1100 may include similar electrical components for performing any or all of the additional operations 1050 described in connection with FIG. 10B, which for illustrative simplicity are not shown in FIG. 11.

In related aspects, the apparatus 1100 may optionally include a processor component 1110 having at least one processor, in the case of the apparatus 1100 configured as a mobile entity. The processor 1110, in such case, may be in operative communication with the components 1102-1106 or similar components via a bus 1112 or similar communication coupling. The processor 1110 may effect initiation and scheduling of the processes or functions performed by electrical components 1102-1106.

In further related aspects, the apparatus 1100 may include a radio transceiver component 1114. A stand alone receiver and/or stand alone transmitter may be used in lieu of or in conjunction with the transceiver 1114. The apparatus 1100 may optionally include a component for storing information, such as, for example, a memory device/component 1116. The computer readable medium or the memory component 1116 may be operatively coupled to the other components of the apparatus 1100 via the bus 1112 or the like. The memory component 1116 may be adapted to store computer readable instructions and data for performing the activity of the components 1102-1106, and subcomponents thereof, or the processor 1110, the additional aspects 1050, or the methods disclosed herein for a mobile device. The memory component 1116 may retain instructions for executing functions associated with the components 1102-1106. While shown as being external to the memory 1116, it is to be understood that the components 1102-1106 can exist within the memory 1116.

Base Station

A base station may be configured to measure and provide network load information for use in dynamically controlling QoS of a multicast transmission. An eNB exemplifies a base station used in multicast transmission, but other wireless base stations, for example picocell or femtocell stations, are not excluded. FIG. 12A illustrates a method 1200 that may be performed by a base station of a wireless communications system, for indicating dynamic bandwidth availability from a base station of a wireless communications system for use in controlling QoS of a multicast transmission. The method 1200 may include, at 1202, determining a currently available bandwidth for multicast transmission at the base station in response to at least one dynamically changing parameter, during the multicast transmission. Method 1200 may further include, at 1204, indicating the currently available bandwidth to an upstream network entity for use in controlling a QoS of the multicast transmission. The operation 1204 may also be performed during the multicast transmission.

In addition, FIG. 12B shows further optional elements 1250 that may be implemented by the base station for indicating multicast bandwidth availability. The elements 1250 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1200 includes at least one operation of FIG. 12B, then the method 1200 may terminate after the at least one operation, without necessarily having to include any subsequent downstream operation(s) that may be illustrated.

The additional elements 1250 may include, at 1206, the base station transmitting an indication of the currently available bandwidth to the network entity via a message over a direct interface. A direct interface means a single interface for communication between two network nodes; for example, the M1 interface between an eNB 604 and MBMS GW 616, or the new direct interface 624 between the eNB 604 and the BM-SC 612, as shown in FIG. 6. In the alternative, the additional elements 1250 may further include, at 1208, the base station transmitting an indication of the currently available bandwidth to the network entity via a message relayed through a plurality of interfaces and network nodes. In the alternative, the additional elements 1250 may further include, at 1210, the base station providing an indication of the currently available bandwidth to the network entity using an Operations & Maintenance based indication, for example as shown at 628 in FIG. 6.

Figure 12C:
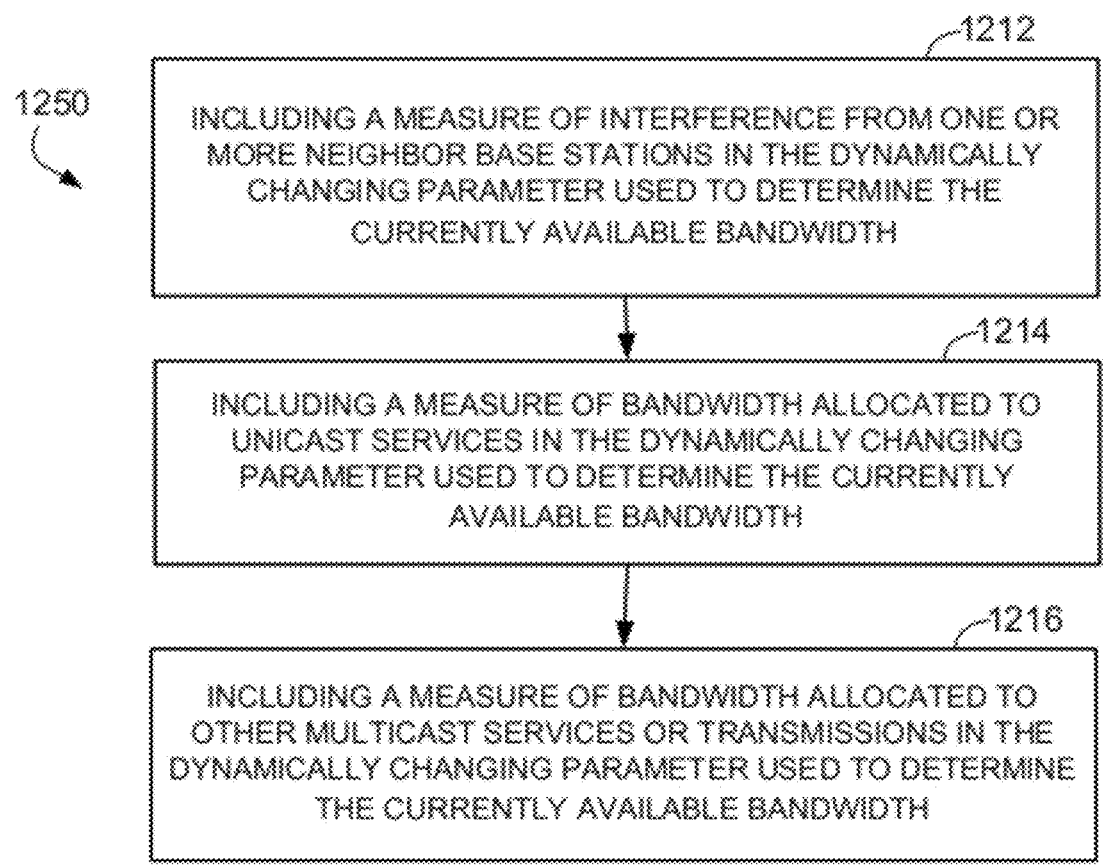

As shown in FIG. 12C, in an aspect, the elements 1250 may include, at 1212, including a measure of interference from one or more neighbor base stations in the dynamically changing parameter used by the base station for determining the currently available bandwidth. In the alternative, or in addition, the elements 1250 may include, at 1214, including a measure of bandwidth allocated to unicast services in the dynamically changing parameter used by the base station for determining the currently available bandwidth. In the alternative, or in addition, the elements 1250 may include, at 1216, including a measure of bandwidth allocated to other multicast services or transmissions in the dynamically changing parameter for determining the currently available bandwidth.

Figure 13:
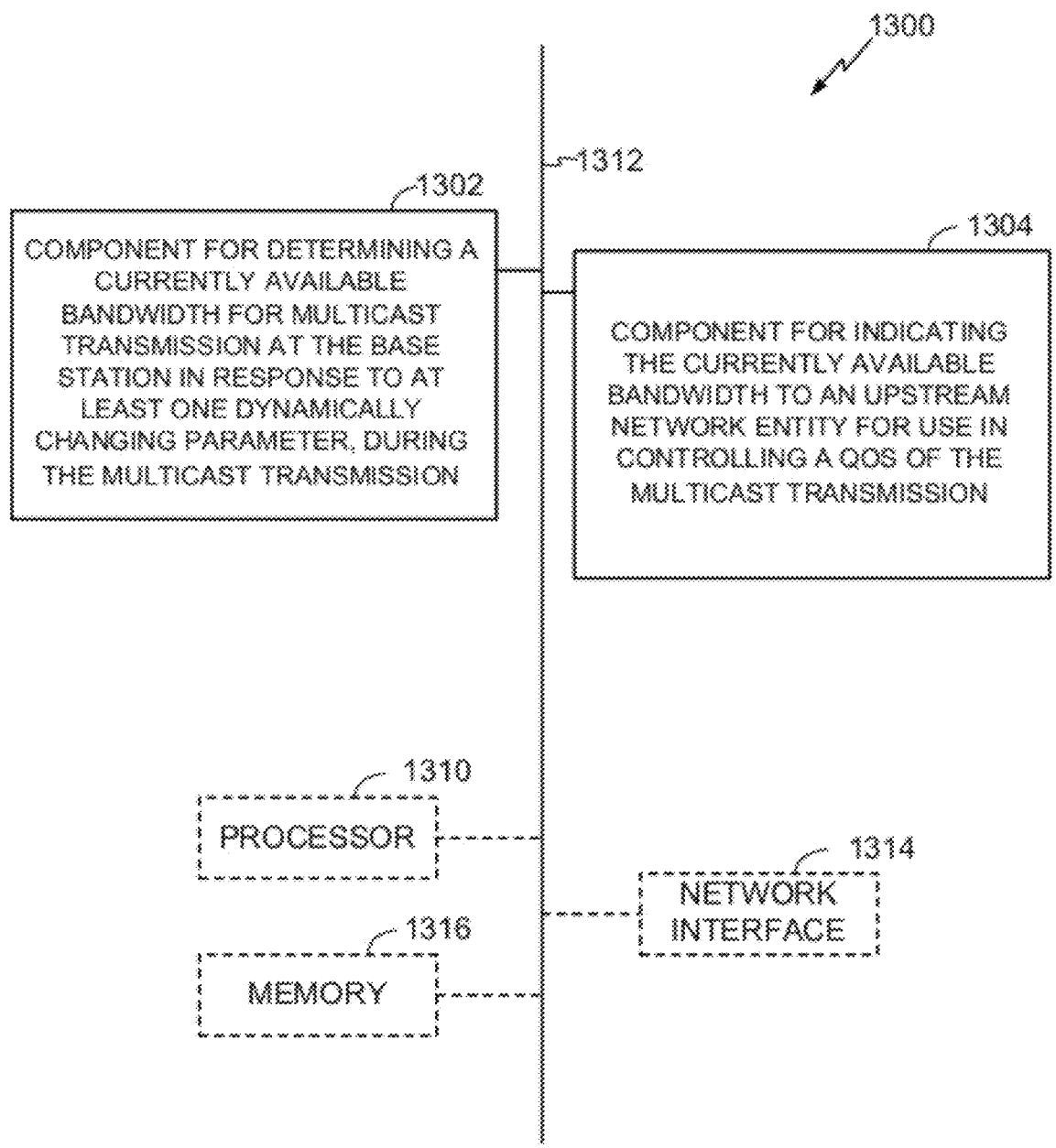
FIG. 13 illustrates an example of an apparatus for implementing the methodologies of FIGS. 12A-C.

With reference to FIG. 13, there is provided an exemplary apparatus 1300 that may be configured as base station in a wireless network, or as a processor or similar device for use within the base station, for indicating dynamic bandwidth availability from a base station of a wireless communications system for use in controlling QoS of a multicast transmission. The apparatus 1300 may include functional blocks that can represent functions implemented by a processor, software, or combination thereof (e.g., firmware).

As illustrated, in one embodiment, the apparatus 1300 may include an electrical component or module 1302 for determining a currently available bandwidth for multicast transmission at the base station in response to at least one dynamically changing parameter, during the multicast transmission. For example, the electrical component 1302 may include at least one control processor coupled to a network interface or the like and to a memory with instructions for determining an available bandwidth using dynamic measurement parameters as disclosed herein. The electrical component 1302 may be, or may include, means for determining a currently available bandwidth for multicast transmission at the base station in response to at least one dynamically changing parameter, during the multicast transmission. Said means may include an algorithm executed by one or more processors. The algorithm may include, for example, measuring available (e.g., unused) downlink bandwidth using at least one of the operations 1250 shown in connection with FIG. 12C.

The apparatus 1300 may include an electrical component 1304 for indicating the currently available bandwidth to an upstream network entity for use in controlling a QoS of the multicast transmission. For example, the electrical component 1304 may include at least one control processor coupled to a memory holding instructions for signaling a network load factor, e.g., available bandwidth, to an upstream entity using any of the signaling operations or interfaces disclosed herein. The electrical component 1304 may be, or may include, means for indicating the currently available bandwidth to an upstream network entity for use in controlling a QoS of the multicast transmission. Said means may include an algorithm executed by one or more processors. The algorithm may include, for example, quantifying a measure of available bandwidth by normalizing against a benchmark (e.g., a percentage or proportion of full bandwidth) or by expressing an absolute value (e.g., bit/second available), and encoding the quantitative information symbolically in a signal to an upstream entity that controls the QoS. The apparatus 1300 may include similar electrical components for performing any or all of the additional operations 1250 described in connection with FIGS. 12B-C, which for illustrative simplicity are not shown in FIG. 13.

In related aspects, the apparatus 1300 may optionally include a processor component 1310 having at least one processor, in the case of the apparatus 1300 configured as a network entity. The processor 1310, in such case, may be in operative communication with the components 1302-1304 or similar components via a bus 1312 or similar communication coupling. The processor 1310 may effect initiation and scheduling of the processes or functions performed by electrical components 1302-1304.

In further related aspects, the apparatus 1300 may include a network interface component 1314 for communicating with other network entities. The apparatus 1300 may optionally include a component for storing information, such as, for example, a memory device/component 1316. The computer readable medium or the memory component 1316 may be operatively coupled to the other components of the apparatus 1300 via the bus 1312 or the like. The memory component 1316 may be adapted to store computer readable instructions and data for performing the activity of the components 1302-1304, and subcomponents thereof, or the processor 1310, the additional operations 1250, or the methods disclosed herein. The memory component 1316 may retain instructions for executing functions associated with the components 1302-1304. While shown as being external to the memory 1316, it is to be understood that the components 1302-1304 can exist within the memory 1316.

Intermediate Network Entity

Figure 14A:
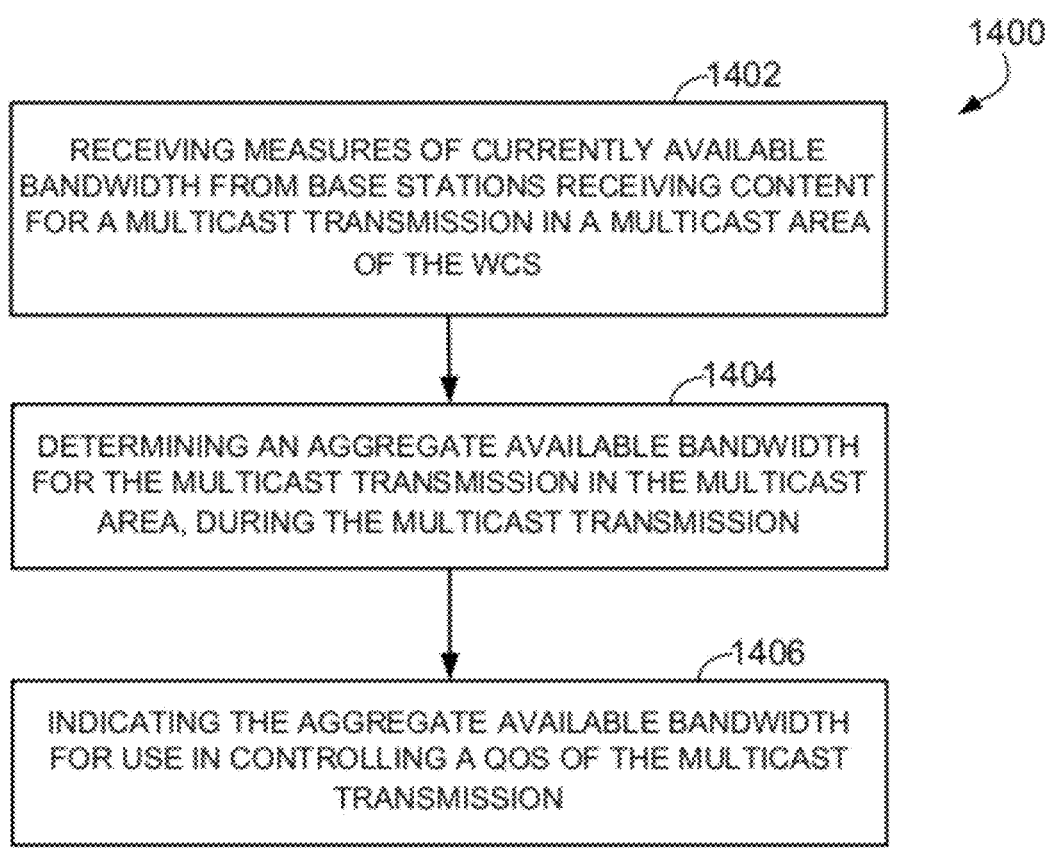
FIGS. 14A-B illustrate embodiments of a methodology for aggregating bandwidth availability measures used for dynamic QoS control in a multicast area, at an intermediate network entity.

An intermediate network entity, for example, an MCE, may be configured to aggregate and provide network load information from a multicast area for use in dynamically controlling QoS of a multicast transmission in the area. FIG. 14A illustrates a method 1400 that may be performed by a intermediate network entity of a wireless communications system, for determining dynamic bandwidth availability from a network entity of a WCS for use in controlling QoS of a multicast transmission. The method 1400 may include, at 1402, receiving measures of currently available bandwidth from base stations receiving content for a multicast transmission in a multicast area of the WCS. The measures may be received at different times, and may change in response to current conditions. The base stations may be broadcasting a multicast transmission, for example, as an eMBMS. Method 1400 may further include, at 1404, determining a measure of aggregate available bandwidth for the multicast transmission in the multicast area, during the multicast transmission. As used herein, an aggregate available bandwidth indicates a measure of available bandwidth for a multicast area determined by processing network load/bandwidth availability information from base stations in the area, for example, a sum, weighted average, average, minimum, maximum, median, or other aggregate measure of available bandwidth. As such, the aggregate available bandwidth may be used to indicate whether or not bandwidth allocated to one or more multicast services in the area may be increased, decreased, or remain static. Method 1400 may further include, at 1406, indicating a measure of the aggregate available bandwidth for use in controlling a QoS of the multicast transmission.

Figure 14B:
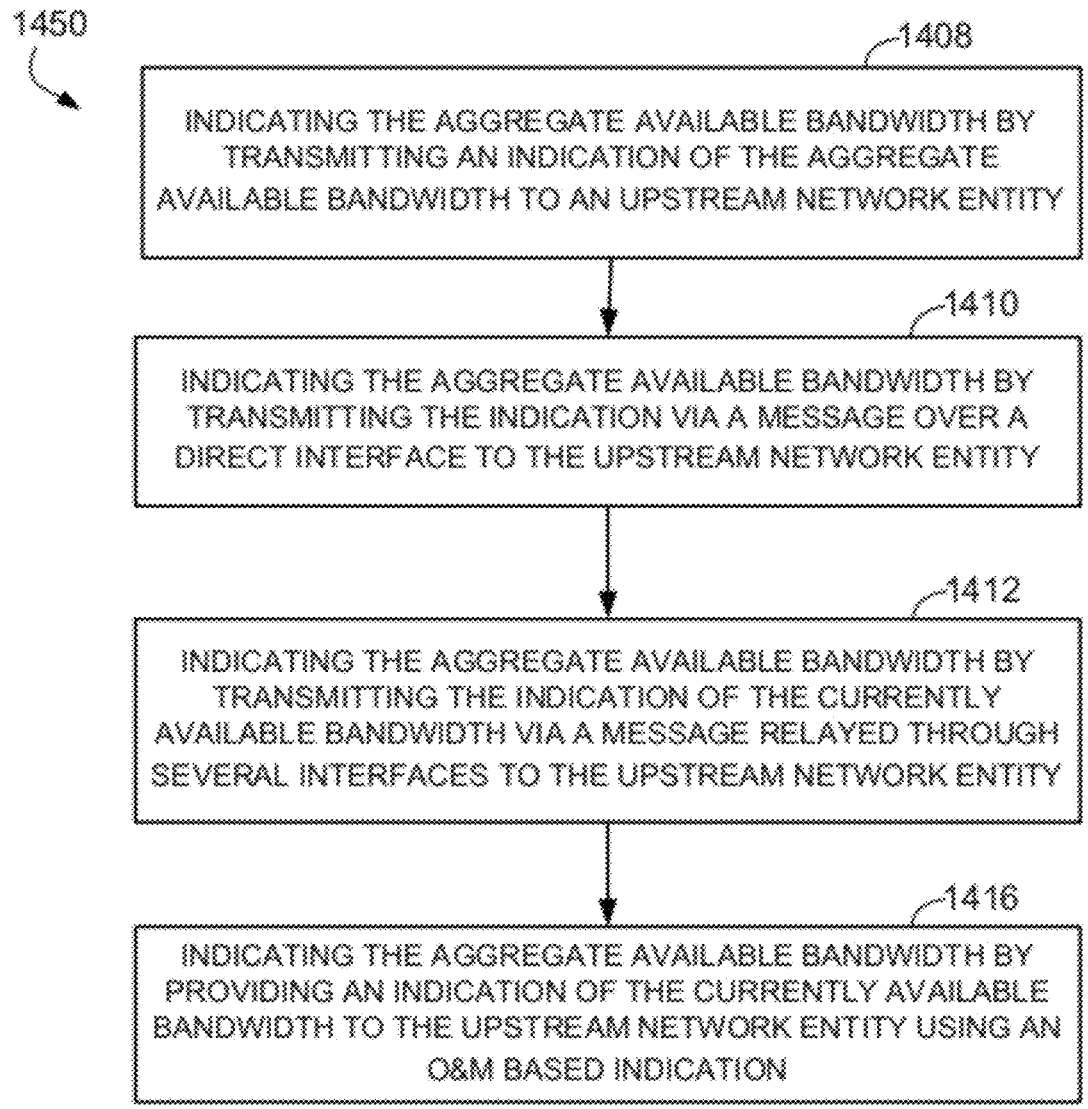

In addition, FIG. 14B shows further optional elements 1450 that may be implemented by the intermediate network entity for indicating multicast bandwidth availability. The elements 1450 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1400 includes at least one of the additional operations 1450, then the method 1400 may terminate after the at least one operation, without necessarily having to include any subsequent downstream operation(s) that may be illustrated.

The additional elements 1450 may include, at 1408, the intermediate network entity indicating the aggregate available bandwidth by transmitting an indication of the aggregate available bandwidth to an upstream network entity. The operation 1408 may be performed during the multicast transmission session or sessions to which the aggregate measure pertains. In the alternative, the additional elements 1450 may further include, at 1410, the intermediate network entity indicating the aggregate available bandwidth by transmitting the indication via a message over a direct interface to the upstream network entity. In the alternative, the additional elements 1450 may further include, at 1412, the intermediate network entity indicating the aggregate available bandwidth by transmitting the indication of the currently available bandwidth via a message relayed through several interfaces to the upstream network entity. In the alternative, the additional elements 1450 may further include, at 1416, the network entity indicating the aggregate available bandwidth by providing an indication of the currently available bandwidth to the upstream network entity using an Operations & Maintenance based indication. The intermediate network entity determining the aggregate available bandwidth and/or performing other operations illustrated in FIGS. 14A-B may be, or may include, a Multicast Coordinating Entity (MCE).

Figure 15:
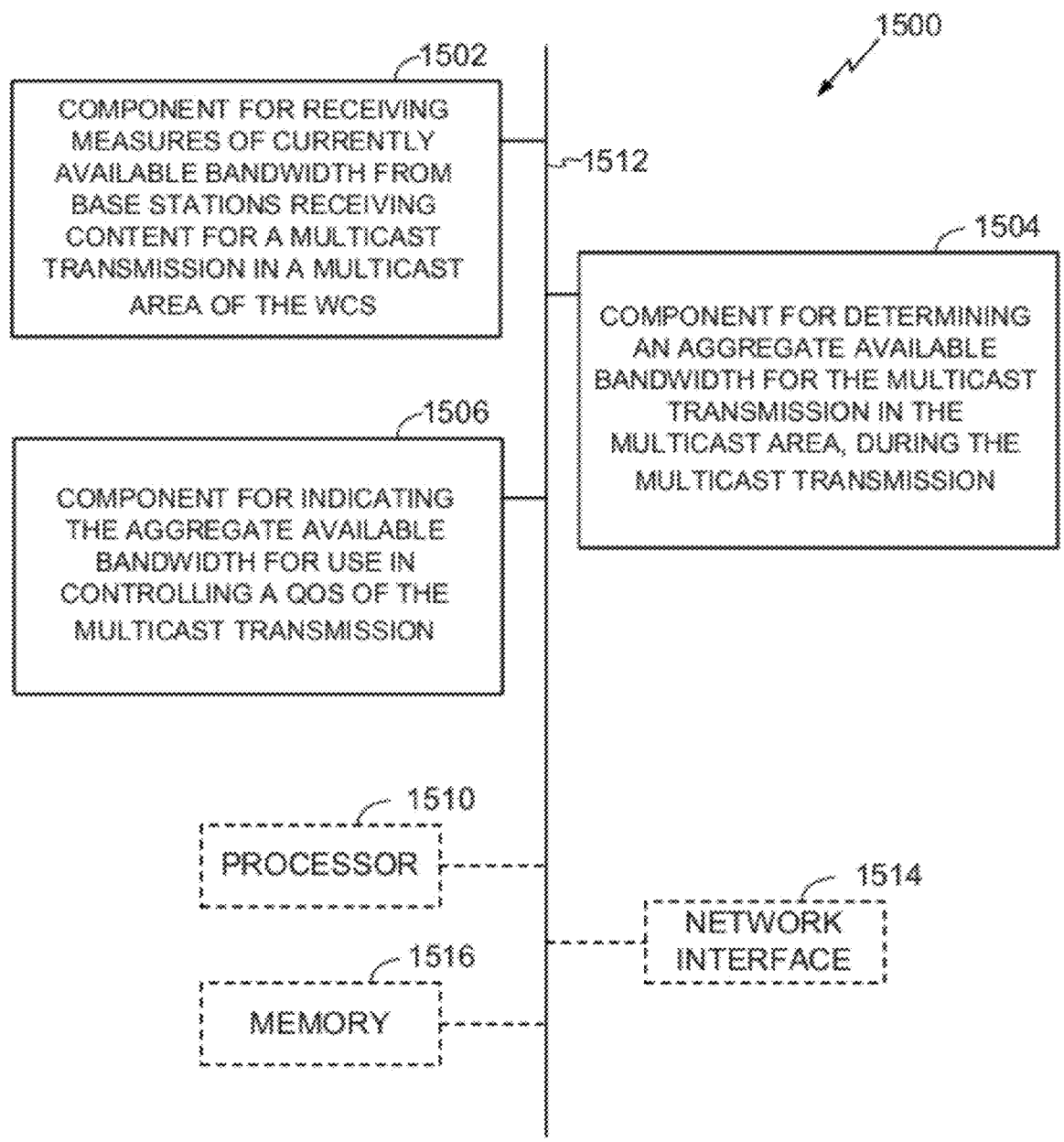
FIG. 15 illustrates an example of an apparatus for implementing the methodologies of FIGS. 14A-B.

With reference to FIG. 15, there is provided an exemplary apparatus 1500 that may be configured as an intermediate network entity in a wireless network, or as a processor or similar device for use within the network entity, for determining current bandwidth availability from a network entity of a WCS for use in controlling QoS of a multicast transmission. The apparatus 1500 may include functional blocks that can represent functions implemented by a processor, software, or combination thereof (e.g., firmware).

As illustrated, in one embodiment, the apparatus 1500 may include an electrical component or module 1502 for receiving measures of currently available bandwidth from base stations receiving content for a multicast transmission in a multicast area of the WCS. For example, the electrical component 1502 may include at least one control processor coupled to a network interface or the like and to a memory with instructions for receiving signals indicating a network load factor, e.g., available bandwidth, from one or more base stations. The electrical component 1502 may be, or may include, means for receiving measures of currently available bandwidth from base stations receiving content for a multicast transmission in a multicast area of the WCS. Said means may include an algorithm executed by one or more processors. The algorithm may include, for example, receiving periodic or episodic messages from multiple base stations in a multicast area over a network link, wherein the messages include the measures of available bandwidth for each base station sending the messages, decoding the messages to obtain the measures, and storing the measures in a computer memory in association with an identifier for the multicast transmission.

The apparatus 1500 may include an electrical component 1504 for determining an aggregate available bandwidth for the multicast transmission in the multicast area, during the multicast transmission. For example, the electrical component 1504 may include at least one control processor coupled to a memory holding instructions for aggregating measures or indications of available bandwidth to determine an aggregate measure of available bandwidth for a multicast area. The electrical component 1504 may be, or may include, means for determining an aggregate available bandwidth for the multicast transmission in the multicast area, during the multicast transmission. Said means may include an algorithm executed by one or more processors. The algorithm may include, for example, aggregating the stored measures of available bandwidth to determine an aggregate available bandwidth for a multicast area, for example by calculating a mean, a sum, a median, or other aggregation, in response to periodic or episodic updates from the base stations. The algorithm may be performed periodically or episodically (e.g., in response to a defined event such as a change in available bandwidth in a multicast area).

The apparatus 1500 may include an electrical component 1506 for indicating the aggregate available bandwidth for use in controlling a QoS of the multicast transmission. For example, the electrical component 1506 may include at least one control processor coupled to a memory holding instructions for signaling the aggregate measure to an upstream entity, using any of the novel operations or interfaces disclosed herein. The electrical component 1506 may be, or may include, means for indicating the aggregate available bandwidth for use in controlling a QoS of the multicast transmission. Said means may include an algorithm executed by one or more processors. The algorithm may include, for example, generating a message including a measure of the aggregate available bandwidth, and transmitting the message to an entity of component designated for specifying a dynamic QoS based on the aggregate measure. The algorithm may be performed periodically or episodically (e.g., in response to a defined event such as a change in available bandwidth in a multicast area). The apparatus 1500 may include similar electrical components for performing any or all of the additional operations 1450 described in connection with FIG. 14B, which for illustrative simplicity are not shown in FIG. 15.

In related aspects, the apparatus 1500 may optionally include a processor component 1510 having at least one processor, in the case of the apparatus 1500 configured as a network entity. The processor 1510, in such case, may be in operative communication with the components 1502-1506 or similar components via a bus 1512 or similar communication coupling. The processor 1510 may effect initiation and scheduling of the processes or functions performed by electrical components 1502-1506.

In further related aspects, the apparatus 1500 may include a network interface component 1514 for communicating with other network entities. The apparatus 1500 may optionally include a component for storing information, such as, for example, a memory device/component 1516. The computer readable medium or the memory component 1516 may be operatively coupled to the other components of the apparatus 1500 via the bus 1512 or the like. The memory component 1516 may be adapted to store computer readable instructions and data for performing operations of the components 1502-1506, and subcomponents thereof, or the processor 1510, the additional operations 1450, or the methods disclosed herein. The memory component 1516 may retain instructions for executing functions associated with the components 1502-1506. While shown as being external to the memory 1516, it is to be understood that the components 1502-1504 can exist within the memory 1516.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such storage (non-transitory) computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transitory storage of transmitted signals. Disk and disc, as used herein, includes compact disc (CD), laser disc, optical disc, digital versatile disc (DVD), floppy disk and blu-ray disc where disks usually encode data magnetically, while discs hold data encoded optically. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for dynamically controlling Quality-of-Service (QoS) for a multicast transmission from a network entity of a wireless communications system (WCS), the method comprising:

initiating a multicast transmission session having an initial QoS and broadcast in a multicast area comprising multiple cells;

generating an updated QoS for the multicast transmission session, in response to a network load factor for the multicast area, prior to termination of the multicast transmission session; and announcing that the updated QoS will take effect at a specified frame boundary or time during the multicast transmission session, wherein the network load factor comprises a measure of aggregate available bandwidth determined by processing bandwidth information from base stations in the multicast area.

2. The method of claim 1, wherein the network entity comprises a Broadcast-Multicast Service Center (BM-SC).

3. The method of claim 1, further comprising updating the multicast transmission session using the updated QoS.

4. The method of claim 1, further comprising indicating the updated QoS to a mobile entity receiving the multicast transmission session.

5. The method of claim 4, wherein the network entity does not receive feedback from the mobile entity.

6. The method of claim 4, wherein indicating the updated QoS comprises providing parameters for streaming a media component to the mobile entity, and specifying, in an announcement, new ones of the parameters taking effect at the specified frame boundary or time.

7. The method of claim 6, further comprising transmitting the announcement according to at least one of: a Session Description Protocol (SDP), a modified SDP, a File Description Table (FDT), or a modified FDT.

8. The method of claim 6, wherein indicating the updated QoS is performed by at least one of: sending the parameters in a corresponding control stream, or including the parameters in headers of a stream transport protocol for the multicast transmission session.

9. The method of claim 8, wherein the stream transport protocol comprises an HTTP push protocol.

10. The method of claim 1, further comprising communicating with an intermediate node within the WCS to obtain at least one of: feedback indicative of the network load factor, an updated QoS, or one or more additional factors not limited to QoS or network load factors for use in controlling the QoS.

11. The method of claim 10, further comprising receiving the network load factor from a Multicast Coordinating Entity (MCE) via at least one of a message over a direct interface, a message relayed through several interfaces, or an Operations & Maintenance based indication.

12. The method of claim 10, further comprising receiving the network load factor from an eNode B (eNB) via at least one of a message over a direct interface, a message relayed through several interfaces, or an Operations & Maintenance based indication.

13. A system for dynamically controlling Quality-of-Service (QoS) for a multicast transmission session from a network entity of a wireless communications system (WCS), the system comprising:
means for initiating a multicast transmission session having an initial QoS and broadcast in a multicast area comprising multiple cells;
means for generating an updated QoS for the multicast transmission session, in response to a network load factor for the multicast area, prior to termination of the multicast transmission session; and
announcing that the updated QoS will take effect at a specified frame boundary or time during the multicast transmission session,
wherein the network load factor comprises a measure of aggregate bandwidth determined by processing bandwidth information from base stations in the multicast area.

14. A system for dynamically controlling Quality-of-Service (QoS) for a multicast transmission from a network entity of a wireless communications system (WCS), comprising:
at least one processor configured for initiating a multicast transmission session having an initial QoS and broadcast in a multicast area comprising multiple cells, for generating an updated QoS for the multicast transmission session prior to termination of the multicast transmission session and in response to a network load factor for the multicast area comprising a measure of the aggregate bandwidth determined by processing bandwidth information from base stations in the multicast area, and for announcing that the updated QoS will take effect at a specified frame boundary or time during the multicast transmission session; and
a memory coupled to the at least one processor for storing data.

15. The system of claim 14, wherein the processor is further configured for operating as a Broadcast-Multicast Service Center (BM-SC) in the WCS.

16. The system of claim 14, wherein the processor is further configured for updating the multicast transmission session using the updated QoS.

17. The system of claim 14, wherein the processor is further configured for indicating the updated QoS to a mobile entity receiving the multicast transmission session.

18. The system of claim 17, wherein the processor is further configured for receiving no feedback from the mobile entity.

19. The system of claim 17, wherein the processor is further configured for indicating the updated QoS by at least one of: providing parameters for streaming a media component to the mobile entity, or specifying, in an announcement, new ones of the parameters taking effect at the specified frame boundary or time.

20. The system of claim 19, wherein the processor is further configured for transmitting the announcement according to at least one of a Session Description Protocol (SDP), a modified SDP, a File Description Table (FDT), or a modified FDT.

21. The system of claim 19, wherein the processor is further configured for indicating the updated QoS by at least one of: sending the parameters in a corresponding control stream, or including the parameters in headers of a stream transport protocol for the multicast transmission session.

22. The system of claim 21, wherein the processor is further configured for configuring the stream transport protocol comprising an HTTP push protocol.

23. The system of claim 14, wherein the processor is further configured for communicating with an intermediate node within the WCS to obtain at least one of: feedback indicative of the network load factor, an updated QoS, or one or more additional factors not limited to QOS or network load factors for use in controlling the QoS.

24. The system of claim 23, wherein the processor is further configured for receiving the network load factor from a Multicast Coordinating Entity (MCE via at least one of a message over a direct interface, a message relayed through several interfaces, or an Operations & Maintenance based indication.

25. The system of claim 23, wherein the processor is further configured for receiving the network load factor from an eNode B (eNB) via at least one of a message over a direct interface, a message relayed through several interfaces, or an Operations & Maintenance based indication.

26. A non-transitory computer-readable medium comprising code for initiating a multicast transmission session having an initial QoS and broadcast in a multicast area comprising multiple cells, for generating an updated QoS for the multicast transmission session prior to termination of the multicast transmission session and in response to a network load factor for the multicast area comprising a measure of the aggregate bandwidth determined by processing bandwidth information from base stations in the multicast area, and for announcing that the updated QoS will take effect at a specified frame boundary or time during the multicast transmission session.

27. A method for using a multicast transmission having a dynamically controlled Quality-of-Service (QoS), using a mobile device, the method comprising:
receiving a content via a multicast transmission session in a wireless communications system;
receiving an updated QoS and an announcement that the updated QoS will take effect at a specified frame boundary or time during the multicast transmission session; and
processing a subsequent portion of the content according to the updated QoS starting at the specified frame boundary or time,
wherein the updated QoS is generated in response to a network load factor for a multicast area comprising a measure of aggregate available bandwidth determined by processing bandwidth information from base stations in the multicast area.

28. The method of claim 27, wherein receiving the updated QoS comprises receiving at least one parameter for processing a media stream of the content.

29. The method of claim 28, wherein receiving the at least one parameter comprises receiving a corresponding control stream containing the at least one parameter for the media stream.

30. The method of claim 28, wherein receiving the at least one parameter comprises receiving the announcement comprising the at least one parameter for taking effect at the specified frame boundary or time.

31. The method of claim 30, further comprising receiving the announcement according to at least one of a Session Description Protocol (SDP), or a modified File Description Table (FDT).

32. The method of claim 28, wherein receiving the at least one parameter comprises receiving the at least one parameter in headers of a stream transport protocol for the multicast transmission session.

33. The method of claim 32, wherein the stream transport protocol comprises an HTTP push protocol.

34. A system for using a multicast transmission having a dynamically controlled Quality-of-Service (QoS), the system comprising:
means for receiving a content via a multicast transmission session in a wireless communications system;
means for receiving an updated QoS and an announcement that the updated QoS will take effect at a specified frame boundary or time during the multicast transmission session; and
means for processing a subsequent portion of the content according to the updated QoS starting at the specified frame boundary or time,
wherein the updated QoS is generated in response to a network load factor for a multicast area comprising a measure of aggregate available bandwidth determined by processing bandwidth information from base station in the multicast area.

35. A system for using a multicast transmission having a dynamically controlled Quality-of-Service (QoS), comprising:
at least one processor configured for receiving a content via a multicast transmission session in a wireless communications system, for receiving an updated QoS and an announcement that the updated QoS will take effect at a specified frame boundary or time during the multicast transmission session, and for processing a subsequent portion of the content according to the updated QoS starting at the specified frame boundary or time, the updated QoS generated in response to a network load factor for a multicast area comprising a measure of aggregate available bandwidth determined by processing bandwidth information from base station in the multicast area; and
a memory coupled to the at least one processor for storing data.

36. The system of claim 35, wherein the processor is further configured for receiving the updated QoS by receiving at least one parameter for processing a media stream of the content.

37. The system of claim 36, wherein the processor is further configured for receiving the at least one parameter by at least one of: receiving a corresponding control stream containing the at least one parameter for the media stream, or receiving the announcement comprising the at least one parameter for taking effect at the specified frame boundary or time.

38. The system of claim 37, wherein the processor is further configured for receiving ones of the announcement according to at least one of: a Session Description Protocol (SDP), or a modified File Description Table (FDT).

39. The system of claim 36, wherein the processor is further configured for receiving the at least one parameter in headers of a stream transport protocol for the multicast transmission session.

40. The system of claim 39, wherein the processor is further configured for receiving the stream transport protocol comprising an HTTP push protocol.

41. A non-transitory computer-readable medium comprising code for receiving a content via a multicast transmission session in a wireless communications system, for receiving an updated QoS and an announcement that the updated QoS will take effect at a specified frame boundary or time during the multicast transmission session, and for processing a subsequent portion of the content according to the updated QoS starting at the specified frame boundary or time, wherein the updated QoS is generated in response to a network load factor for a multicast area comprising a measure of aggregate available bandwidth determined by processing bandwidth information from base station in the multicast area.

* * * * *